United States Patent [19]
Taylor et al.

[11] Patent Number: 5,899,981
[45] Date of Patent: May 4, 1999

[54] METHOD AND SYSTEM FOR PROCESSING EXPENSE VOUCHERS

[75] Inventors: Janet Catherine Taylor, Manotick, Canada; Sybil Steele-Henderson, Durham; Timothy Dale Riddle, Fuquay Varina, both of N.C.

[73] Assignee: Northern Telecom Limited, Montreal, Canada

[21] Appl. No.: 08/773,905

[22] Filed: Dec. 27, 1996

[51] Int. Cl.⁶ .................................................. G06F 17/00
[52] U.S. Cl. ................................. 705/30; 705/20; 705/24
[58] Field of Search ................................. 705/30, 20, 24, 705/29, 34, 40

[56] References Cited

U.S. PATENT DOCUMENTS

| | | | |
|---|---|---|---|
| 4,852,000 | 7/1989 | Webb et al. | 364/406 |
| 5,010,485 | 4/1991 | Bigari | 364/408 |
| 5,270,922 | 12/1993 | Higgins | 364/408 |
| 5,297,032 | 3/1994 | Trojan et al. | 364/408 |

*Primary Examiner*—Thomas R. Peeso
*Attorney, Agent, or Firm*—Foley & Lardner

[57] ABSTRACT

A system and method for processing expense reimbursement claims supported by at least one receipt associated with identifying indicia. The system includes computer readable memory, in which is defined an expense voucher record having a charge field for identifying an entity incurring expenses, an expense field for identifying expenses incurred by the entity, and a voucher identification field. The system further includes a computer in communication with the memory, for loading the voucher identification field with a first code associated with the identifying indicia, for comparing the contents of the charge field and the expense fields with corresponding reference data according to pre-defined verification criteria to determine whether or not the contents of the charge field and the expense field meet the verification criteria. If the contents of the charge field and expense field meet the pre-defined verification criteria, the computer associates the expense voucher record with a position in a receipt required list.

54 Claims, 52 Drawing Sheets

Currency exchange Rate List
64   US dollar     1.3878
66   British Pound 2.2121

Payment file - record format
67   Employee Name
69   Employee Address
71   Mode of Payment
73   Voucher No.
75   AMEX Card No.
77   Payment Amount
79   Employee Bank Account No.

Currency Maintenance

1996/08/22

| | | | |
|---|---|---|---|
| Cancel | Save | Add | Modify | History |

From Currency: AED United Arab Emirates: UAE Dirham    ACTIVE    ⬜ VAT Applicable?    — 75.28
                    ⬐ 75.30

To Currency:
— 75.34   75.32   75.36   75.38        75.40          75.42          75.44

| Currency | VRU | Description | Exchange Rate | Effective Date | Expiration Date |
|---|---|---|---|---|---|
| CAD | 51 | CANADIAN DOLLARS | 0.37140000 | 1996/01/02 | |
| CAD | 52 | CANADIAN DOLLARS (QUEBEC) | 0.37140000 | 1996/01/02 | |
| USD | 53 | United States : US Dollar | 0.27300000 | 1996/01/02 | |

Currency :                 Exchange Rate :
Description :              Effective Date (yyyy/mm/dd) :
                           Expiration Date (yyyy/mm/dd) :

Fig. 5e

From Currency: AUD Australian Dollar

To currency:

Currency History

1996/08/22

75.46

☐ VAT Applicable?

| Currency | Description | Exchange Rate | Effective Date | Expiration Date |
|---|---|---|---|---|
| CAD | Canadian Dollar | 1.01410000 | 1996/01/02 | |
| CAD | Canadian Dollar | 1.00920000 | 1995/12/01 | |
| CAD | Canadian Dollar | 1.03360000 | 1995/11/08 | |
| CAD | Canadian Dollar | 1.01680000 | 1995/10/03 | |
| CAD | Canadian Dollar | 1.00990000 | 1995/09/02 | |
| CAD | Canadian Dollar | 0.99960000 | 1995/08/06 | |
| CAD | Canadian Dollar | 0.99960000 | 1995/07/29 | |
| CAD | Canadian Dollar | 0.98180000 | 1995/07/01 | |
| CAD | Canadian Dollar | 0.98180000 | 1995/06/04 | |

Fig. 5f

Accounting Periods

1996/08/22

75.50

| Period (yymm) | Start Date (yyyy/mm/dd) | End Date (yyyy/mm/dd) |
|---|---|---|
| 9601 | 1996/01/01 | 1996/02/03 |
| 9602 | 1996/02/04 | 1996/03/02 |
| 9603 | 1996/03/03 | 1996/03/31 |
| 9604 | 1996/04/01 | 1996/04/27 |
| 9605 | 1996/04/28 | 1996/06/01 |
| 9606 | 1996/06/02 | 1996/06/30 |
| 9607 | 1996/07/01 | 1996/08/03 |
| 9608 | 1996/08/04 | 1996/08/31 |
| 9609 | 1996/09/01 | 1996/09/30 |
| 9610 | 1996/10/01 | 1996/11/02 |
| 9611 | 1996/11/03 | 1996/11/30 |
| 9612 | 1996/12/01 | 1996/12/31 |

Cancel  Save  Add  Modify

Entity Types: NT

Current Year : 1996

◁ Previous Year

Next Year ▷

Fig. 5h

Search Criteria

Department/Project Number: 1143

Entity: 540 Switching Division

General Ledger Accounts     1996/08/22

75.52

| Type of Expense | G/L Account Number | G/L Account Status |
|---|---|---|
| BUSINESS MEALS | 54073610 1143 | ACTIVE |
| CELLULAR PHONES | 54073434 1143 | ACTIVE |
| CONFERENCES BETWEEN NT EMPLOYEES | 54073607 1143 | ACTIVE |
| EDUCATIONAL ASSISTANCE | 54073672 1143 | ACTIVE |
| EMPLOYEE ACTIVITIES | 54073671 1143 | ACTIVE |
| ENTERTAINMENT OF CUSTOMERS AND NON-NT EMPLOYEES | 54073611 1143 | ACTIVE |
| EXTERNAL PROFESSIONAL TRAINING | 54073621 1143 | ACTIVE |
| LONG DISTANCE TELEPHONE CALLS | 54073432 1143 | ACTIVE |

Fig. 5i

Audit Parameters — 1996/08/22

75.54

| Expense Category | Voucher Type | Expense Period | Currency | Limit Type | Expense Limit | Effective Date | Expiration Date |
|---|---|---|---|---|---|---|---|
| CAR RENTAL | TE | WEEK | USD | EXCEPT | 300 | 1994/09/01 | |
| CELLULAR PHONE | TE | EACH | USD | EXCEPT | 250 | 1994/09/01 | |
| CHILD SAFETY SEAT | TE | EACH | USD | EXCEPT | 30 | 1994/09/01 | |
| CONFERENCE (NT/BNR EMPLOYEE) | TE | EACH | USD | EXCEPT | 500 | 1994/09/01 | |
| COUNTRY CLUB DUES | TE | EACH | USD | EXCEPT | 2000 | 1994/09/01 | |
| EDUCATION ASSISTANCE | TE | EACH | USD | EXCEPT | 500 | 1994/09/01 | |
| EMPLOYEE ACTIVITIES | TE | EACH | USD | EXCEPT | 100 | 1994/09/01 | |

Cancel / Save  Add  Modify  History

Expense Category :
Voucher Type :
Expense Category :

Expense Limit :
Effective Date (yyyy/mm/dd) :
Expiration Date (yyyy/mm/dd) :

Audit Parameter History

1996/08/22

Expense Category : TAXI/PARKING/TOLLS
Voucher Type : TRAVEL AND ENTERTAINMENT 75.56 →

| Expense Period | Currency | Limit Type | Expense Limit | Effective Date | Expiration Date |
|---|---|---|---|---|---|
| PER WEEK | USD | EXCEPT | 100 | 1994/09/01 | 1995/05/05 |

System Parameters  1996/08/22

[Buttons: Cancel, Save, Add, Modify, History]

75.58

| Parameter Type | Parameter Description | Parameter Code | Parameter Value | Effective Date | Expiration Date |
|---|---|---|---|---|---|
| ACCESS | SYSTEM-WIDE DESKTOP ACCESS AVAI | DESKTOP | Y | 1994/09/01 | |
| ACCESS | SYSTEM-WIDE KIOSK ACCESS AVAILAB | KIOSK | N | 1994/09/01 | |
| ACCESS | SYSTEM-WIDE VRU ACCESS AVAILABL | VRU | Y | 1994/09/01 | |
| AMEXCYCL | DAYS TO SUBTRACT FROM AMEX CYCL | DAYLEAD | 4 | 1994/09/01 | |
| ENVELOPE | RCPT ENVELOPE MUST BE RECEIVED BE | AUDIT | N | 1994/09/01 | |
| GL | PARTIAL GL ACCT FOR RECOVERABLE | GST | 1350903 | 1994/09/01 | |
| GL | PARTIAL GL ACCT FOR RECOVERABLE | GST | 1351003 | 1994/09/01 | |

Description :                                    Parameter Value :

Code :                                           Effective Date (yyyy/mm/dd) :

Type :                                           Expiration Date (yyyy/mm/dd) :

Fig. 5I

Forms:     Forms Maintenance     1996/08/22

75.62

| Abbreviation | Description | Language |
|---|---|---|
| EVSAB | ALTERNATE BANKING INFORMATION | FRENCH |
| EVSAB | ALTERNATE BANKING INFORMATION | ENGLISH |
| EVSCA | AMERICAN EXPRESS APPLICATION | FRENCH |
| EVSCA | AMERICAN EXPRESS APPLICATION | ENGLISH |
| EVSCE | CANADIAN EXPENSE ENVELOPE | FRENCH |
| EVSCE | CANADIAN EXPENSE ENVELOPE | ENGLISH |
| EVSAA | EMPLOYEE AGREEMENT FORM | FRENCH |
| EVSAA | EMPLOYEE AGREEMENT FORM | ENGLISH |
| EVSFT | FOREIGN TRAVEL AUTHORIZATION | FRENCH |

Form Abbreviation :

Form Description :

Form language :

Fig. 5n

Employee Profile

Name : HENDERSON, SYBIL S  
Dept. No. : 4116  
Entity Code : 540

Global Id : 0203051  
Location : PPARK  
Region :

Home Address

Address: 2106 SNOWCREST TR  
DURHAM, NC USA 27707

Home Phone: (919) 419-1025

Alternate Address

Address: 2106 SNOWCREST TRAIL  
DURHAM, NC USA 27707

Effective : 1995/06/01    Expires : 2028/07/07

Close

Fig. 8

Universal Employee Profile - record format

| | |
|---|---|
| 90 | Global Identification Number |
| 92 | Name |
| 94 | Address |
| 96 | Department number |
| 98 | Entity |
| 100 | Location code |
| 102 | Region |
| 104 | Internal Mail Stop |
| 106 | Bank Account No. |

Employee Voucher Profile - record format

| | | |
|---|---|---|
| 110 | *Pay Employee Without receipts flag | -MGR. review |
| 112 | Manager hold flag | -MGR review Module |
| 114 | Process centre Hold Flag | -EVS |
| 116 | Alternate Mailing address | -EVS |
| 118 | Alternate Bank Account No. | -EVS |
| 120 | *Manager review date | -MGR. review Module |
| 122 | *Processing centre review date | -EVS |
| 124 | VRU Access flag | -EVS Admin |
| 126 | *Amex Card accounts | -credit provider interface |
| 128 | Permanent Advance | -EVS |
| 130 | Temporary Advance | -EVS |

Fig. 10

EVS User Preferences — 132

Expense Item Preferences

Incurred Currency : United States : US dollar — 136

Payment Type : EMPLOYEE — 138

Charge To Preferences

Department/Project Number : 4116 — 140

☐ incurred in Quebec

Entity Code : 540 — 142

Currency Preference List

Available Currency:
- Algerian Dinar
- Australian Dollar
- Austria : Schilling
- Belgian Franc
- Brazilian Real User Currency:

134 — Defaults | Cancel | Save

Fig. 11

Credit Provider data table - record format
Amex card information file
152   Global Identification Number
154   Employee name
156   AMEX Card Number
158   Other card info

Fig. 13a

Voucher Expenses

Remove | Totals | Print | Cancel | Save
— 224

Expense Voucher Number: [ ]  Department/Project Number: [4116]  Entity Code: [540]
— 186
Spouse Travel Included? ●No ○Yes
— 196   — 190  188
Destination(s): [ ]
Purpose: ▲ [ ]

| Expense Category | Sat - 1995/07/01 | Sun - 1995/07/02 | |
|---|---|---|---|

— 222

| Airfare | Ground Transportation | Taxi/Parking |
| Car Rental | Hotel | Telephone |
| Conference | Meals | Other |
| Entertainment | Personal Car Mileage | |

Payment Type
[E - EMPLOYEE ▼]

Currency
[United States: US Dollar ▼]
☐ Incurred in Quebec

Explanation
[ ◁  ▷ ]

Fig. 16

Electronic voucher format

| | | |
|---|---|---|
| 180 | Header: | |
| 184 | | Global Identification Number |
| 186 | | Voucher No. |
| 188 | | Purpose of expense |
| 190 | | Destination |
| 192 | | From/to dates of expenses |
| 194 | | Entity/project being charged |
| 196 | | Spousal travel |
| 198 | | Currency |
| 200 | | Payment type |
| 182 | Expenses: | |
| 202 | | Airfare |
| 204 | | Car rental |
| 206 | | Taxi/Parking |
| 208 | | Ground Transport |
| 210 | | Hotel |
| 212 | | Meals |
| 214 | | Telephone |
| 216 | | Entertainment |
| 218 | | Conference |
| 220 | | Other |

Fig. 17

| Expense Voucher Number | Start Date | End Date | Submit Date | Status | Voucher Pur |
|---|---|---|---|---|---|
| 2000003140 | 1995/07/01 | 1995/07/02 | 1995/08/09 | On hold | Test Counter |
| 1000214570 | 1995/07/09 | 1995/07/11 | 1995/07/12 | ACCEPTED-PAYMENT PENDING | EVS-Disburse |

Review Summary

Find / Review

Manager Review Summary

Employee Criteria
- Last Name :
- First Name :
- Employee Global ID :

Voucher Criteria
- Start Date (YYMMDD) :
- End Date (YYMMDD) :
- Not Reviewed : ☐

Voucher Status: ALL ▼
Levels Down: 1 ▼  Business Period: NONE ▼

| Employee Name | Global ID | Voucher Number | Voucher Total | | Status | Submission Date | Manager Review Date |
|---|---|---|---|---|---|---|---|
| JACKSON, RAMONA | 0202678 | 2000017325 | USD | 50.85 | HOLD | 1996/05/14 | 1996/05/15 |
| JACKSON, RAMONA | 0202678 | 3520000000 | USD | 915.00 | HOLD | 1996/04/24 | 1996/04/25 |
| JACKSON, RAMONA | 0202678 | 5230000000 | USD | 1,425.00 | HOLD | 1996/04/24 | 1996/04/25 |
| JACKSON, RAMONA | 0202678 | 2350000000 | USD | 574.96 | HOLD | 1996/04/24 | 1996/04/25 |
| JACKSON, RAMONA | 0202678 | 1919828273 | USD | 1,110.79 | HOLD | 1996/04/03 | 1996/04/03 |
| JACKSON, RAMONA | 0202678 | 3737373755 | USD | 100.00 | HOLD | 1996/03/20 | 1996/03/22 |
| JACKSON, RAMONA | 0202678 | 2828282837 | USD | 1,490.00 | HOLD | 1996/03/20 | 1996/03/20 |
| JACKSON, RAMONA | 0202678 | 1160000011 | USD | 1,900.00 | HOLD | 1996/03/20 | 1996/03/25 |
| JACKSON, RAMONA | 0202678 | 2828282882 | USD | 910.00 | HOLD | 1996/03/20 | 1996/03/20 |

242

Receipts Detail

1996/08/22
TE0000000050

— 75.78

| Employee's Id | Employee's Name | Voucher # | First Scanned by | First Scanned On |
|---|---|---|---|---|
| 0188033 | HERRERA, JUAN D | 1000181478 | WHALEY, SABRINA | 1995/11/16 |
| 0188072 | MARQUART, DENNIS P | 1000213337 | WHALEY, SABRINA | 1995/11/16 |
| 0507511 | COPE, TERRY D | 2001674965 | WHALEY, SABRINA | 1995/11/16 |
| 0188045 | PAINE, MICHAEL L | 2001701521 | WHALEY, SABRINA | 1995.11/16 |
| 0188045 | PAINE, MICHAEL L | 2001701649 | WHALEY, SABRINA | 1995/11/16 |
| 0504977 | MADER, SCOTT | 2001705023 | WHALEY, SABRINA | 1995/11/16 |
| 0504978 | WIER, ANDREW G | 2001705069 | WHALEY, SABRINA | 1995/11/16 |
| 0507508 | JOHNSON, GERALD G | 2001705078 | WHALEY, SABRINA | 1995/11/16 |
| 0504979 | WEBSTER, BLAINE R | 2001705096 | WHALEY, SABRINA | 1995/11/16 |
| 0504982 | NORMANDIN, BRIAN L | 2001705276 | WHALEY, SABRINA | 1995/11/16 |
| 0504983 | BROWN, SCOTT A | 2001705294 | WHALEY, SABRINA | 1995/11/16 |
|  |  | 2001705311 | WHALEY, SABRINA | 1995/11/16 |

Voucher Lookup

Global Id: 0202938
Voucher Number: 
Voucher Status: ALL

0202938  RIDDLE, TIMOTHY D
1996/08/22

75.52

| Voucher Number | Scan Date | Audit Date | Mgr Rev Date | Submission Date | Voucher Total | Voucher Status |
|---|---|---|---|---|---|---|
| 7777777786 | | | 1996/08/19 | 1996/08/19 | 605.00 | ON HOLD |
| 2005294954 | | | 1996/08/16 | 1996/08/16 | 800.00 | ON HOLD |
| 2003601396 | | | 1996/07/09 | 1996/07/09 | 802.00 | ON HOLD |
| 2003601378 | | | 1996/07/09 | 1996/07/09 | 10964.23 | ON HOLD |
| 2003970063 | | | 1996/07/08 | 1996/07/08 | 2979.10 | ACCEPTED-READY FOR PAYMENT |
| 2003970081 | | | 1996/07/08 | 1996/07/08 | 1050.00 | ON HOLD |
| 2003970072 | | | 1996/07/08 | 1996/07/08 | 500.00 | ON HOLD |
| 1500000022 | | | 1996/07/01 | 1996/07/01 | 25.00 | ON HOLD |

Hide All Invoices    View Voucher Details

Fig. 21c

Stored Voucher Search — 1996/08/22

75.54

Search Criteria:
- Global Id : 0195137
- First Name :
- Last Name :
- Voucher Number :

[Find]

| Name | Voucher Number | Storage Box # | First Scanned By |
|---|---|---|---|
| MICHAELS, DAVID C | 1000004933 | TE000000001 | HENDERSON, SYBIL S |
| MICHAELS, DAVID C | 1000006788 | TE000000001 | HENDERSON, SYBIL S |
| MICHAELS, DAVID C | 1000006797 | TE000000001 | HENDERSON, SYBIL S |
| MICHAELS, DAVID C | 1000003998 | TE000000007 | HENDERSON, SYBIL S |
| MICHAELS, DAVID C | 1000003970 | TE000000007 | HENDERSON, SYBIL S |
| MICHAELS, DAVID C | 1000177392 | TE000000009 | HENDERSON, SYBIL S |

Matches : 22

Fig. 21d

Employee Profile — 1996/08/14 — MICHAELS, DAVID C 75.86

Home Address Information
Address : 2333 WELSH TAVERN WY
           WAKE FOREST, NC US 27587
Home Phone : 919 5540969

Alternate Address Information
Street Line 1 :
Street Line 2 :
City :
State/Province :
Postal Code :
Country :
Effective Date :            (yyyy/mm/dd)
Expiration Date :           (yyyy/mm/dd)

Cancel  Save  Find  Print  Comments 75.96

Employee Information
Global ID : 0195137
Government Id : 527-57-9664
Department : 1143
Charge To Dept : 1143
Entity : 540 NT USD
Location : 570 RTP
Band : 7
Internal Mail Stop (ESN) : 570318
Work Phone (ESN) : 6-255-8519
Status : A
Status Date :
Payroll Source : TRIAD
Currency (Rmbrst) : USD
Total Adjustment Amount Due
Company : 0.00

Employee Default Actions :

| Action | | Reason Description |
|---|---|---|
| ACCESS-DESKTOP DENIED | ● No ○ Yes | |

Employee Access :
Access Indicator : Y
Access Type :
Review Indicator : Y

| Employee Accounts | Adjustment Summary | Cash Advances | Cash Receipts |
|---|---|---|---|

1996/08/21  
RIDDLE, TIMOTHY D

Employee Accounts

| Cancel | Save |
|--------|------|

Bank Accounts:

| Add | Modify | Remove | Comments |

| Account Number | Account Type | Bank Routing Number | Currency | Active Account? | Account Source | Effective Date | Expiration Date |
|---|---|---|---|---|---|---|---|
| 3933351268 | SAV | 18641198 | USD | YES | EVS | 1996/04/26 | |
| 1711130947 | CHK | 25312205 | USD | NO | EVS | 1996/04/26 | |
| 1711130948 | | 25312205 | CAD | NO | EVS | 1996/03/20 | 1996/03/20 |
| 1711130946 | CHK | 25312205 | USD | NO | PAYROLL | 1996/02/23 | |

75.98

American Express Accounts:

| Account Number | Currency | Active Account? | Effective Date | Expiration Date |
|---|---|---|---|---|
| 3464-470789-57225 | USD | YES | 1995/11/29 | |
| 3464-679989-05227 | USD | NO | 1994/11/09 | |

Account Number :  
Account Active? :  
Account Source :

Bank Routing Number :  
Effective Date (yyyy/mm/dd) :  
Expiration Date (yyyy/mm/dd) :

Currency :  
Bank Account Type :

Cash Advances

1996/08/21　RIDDLE, TIMOTHY D

— 75.100

| Cancel | Save |
|--------|------|

Global Id : 0202938

| Add | Modify | Void | Print |

Adjustment Information :

Adjustment Type : EMPLOYEE ISSUED TEMPORARY ADVANCE
Adjustment Reason : TEMPORARY ASSIGNMENT
Adjustment Description : temporary assignment to Ronald McDonald Unviersity

Payment Information :

Payment Type : Employee - Direct Deposit
Payment Amount : 20.00
Check Number :
Payment Currency : USD

Fig. 21h

Cash Receipt Summary

1996/08/21
RIDDLE, TIMOTHY D

Global Id : 0202938

| Description | Payment Type | Amount | Currency | Check Number |
|---|---|---|---|---|
| OVERPAYMENT ON HOTEL, ENTERED 50! | Check/Cash Payment Received from | 50.00 | USD | 871 |
| for reimbursement | Check/Cash Payment Received from | 400.00 | USD | 1123 |
| hotel billed twice | Check/Cash Payment Received from | 525.98 | USD | 45896 |
| received check 1200 for payment of a | Check/Cash Payment Received from | 1500.00 | USD | 1200 |
| received from payment of 2 movie : | Check/Cash Payment Received from | 19.00 | USD | 5000 |

Cash Receipts — 1996/08/21 — RIDDLE, TIMOTHY D 75.104

Cancel | Save | Add | Modify | Void | Summary

Global Id : 0202938

Adjustment Information :

Adjustment Type : CHECK/CASH RECEIVED FROM EMPLOYEE

Adjustment Description : OVERPAYMENT ON HOTEL, ENTERED 5050.00 INSTEAD OF 5000.00

Payment Information :

Payment Type : Check/Cash Payment Received from Employee
Payment Amount : 50.00
Check Number : 871
Payment Currency : USD

Fig. 21j

Adjustment Summary

1996/08/21
RIDDLE, TIMOTHY D 75.106

Global Id : 0202938

| Adjustment Number | Adjustment Type | Adjustment Amount | Currency | Adjustment Date | Adjustment Status |
|---|---|---|---|---|---|
| 338 | Employee overpaid for previous voucher | 10.00 | USD | 1996/08/19 | DUE |
| 328 | Check/cash received from employee | 400.00 | USD | 1996/04/17 | INVPEND |
| 326 | Check/cash received from employee | 525.98 | USD | 1996/04/17 | INVPEND |
| 324 | Employee issued temporary advance | 20.00 | USD | 1996/04/17 | INVPEND |
| 323 | Check/cash received from employee | 19.00 | USD | 1996/04/17 | INVPEND |
| 322 | Check/cash received from employee | 1500.00 | USD | 1996/04/17 | INVPEND |
| 319 | Check/cash received from employee | 50.00 | USD | 1996/04/17 | INVPEND |
| 318 | Check/cash received from employee | 50000000.00 | USD | 1996/04/17 | VOID |
| 316 | Employee issued temporary advance | 5000.00 | USD | 1996/04/17 | VOID |
| 315 | Employee issued temporary advance | 90000.22 | USD | 1996/04/17 | VOID |

Fig. 21k

Employee Profile Comment 75.110

| Date/Timestamp | Comment |
|---|---|
| 1996/03/11 07:50:04 | A comment button was added to the screen to allow general comments to be added for an employee. |
| 1996/03/11 07:51:41 | Comment window should not close when I hit save. |

Date/Timestamp                Comment

[Add]                                    [Cancel] [Save]

General Instructions

Fill in the information on pages one and two of this worksheet, including the itemized expenses, before dialing the EVS Processing Center (1-800-VOUCHER). Call the EVS VRU and enter the information when prompted. Press the number sign [#] to end an entry.

When you've completed your call, place this worksheet and your receipts in the EVS pre-printed barcoded envelope and mail to the EVS Processing Center.

Note: Voucher may not exceed 14 days from start to end date.

If you traveled, please state purpose and destination of trip: _____

Your Global ID Number : ☐☐☐☐☐☐
Barcoded Envelope Number : ☐☐☐☐☐☐☐☐
*COEO Job Number : ☐☐☐☐☐☐-☐☐  (for Installers' Use Only)
Entity Code : ☐☐☐  *Department/Project Number : ☐☐☐☐☐☐
Voucher Start Date : ☐☐☐☐☐☐  Voucher End Date : ☐☐☐☐☐☐
 (Please enter as YYMMDD; example :[9][4][0][3][2][5] for March 25, 1994)

*To enter an alphanumeric string, please refer to the illustration and follow the guidelines outlined below.

• use the phone keypad to enter an alphanumeric string (e.g. COEO Job Number, Department/Project Number)

"d" is entered as *31
"e" is entered as *32
"f" is entered as *33

• Enter each letter of the alphabet as a two-number series preceded by the star sign [*]

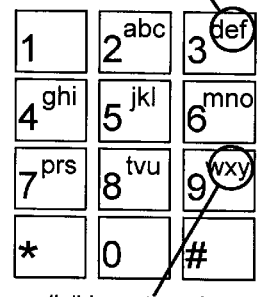

• Enter star [*]; then enter the number which corresponds to any letter contained in the three-character series shown on the number key (ex: "7" corresponds to any letter within the series "prs")

• determine the position of the character within the series: enter the number corresponding (ex: "2" refers to the second position, or "r" in the series "prs")

"z" is entered as *94

• enter "r" as *72

Example entry: COEO Job Number 1H2345-67, entered as 1*42234567#

Note: "q" and "z" are entered as the fourth letter in the series (i.e., *74 and *94)

Expense Items

Expense Categories
Enter the appropriate code in the first two blocks.
01 Air Fare
02 Bus or Train
03 Car Rental
04 Conference
05 Education Assistance
06 Employee Activities (e.g., child safety seat, flowers, spot awards, etc)
07 Entertainment
08 External Training
09 Hotel
10 Meals
11 Mileage
12 Miscellanous (e.g., safety shoes, laundry, small expenditures, etc.)
13 Professional Dues or Memberships
14 Subscriptions, Books
15 Taxi, Parking, Tolls
16 Telephone Currency Codes
Enter the appropriate code in the fourth and fifth blocks.
51 Argentina (austral)
52 Australia (dollar)
53 Brazil (curziero)
54 Canada (dollar)
55 Canada (spent in Quebec)
56 China (yuan)
57 France (franc)
58 Germany (mark)
59 Hong Hong (dollar)
61 Japan (yen)
62 Mexico (new peso)
63 Poland (zloty)
64 Singapore (dollar)
65 US (dollar)

Payment Types
Enter the appropriate code in the last open block.
1 Pay to Employee
2 American Express (AMEX)

Example Expense Item :

| 1 | 0 | # | 5 | 3 | # | 4720 | # | 1 | # |

As illustrated above, to enter total meal expenses of $47.20 U.S., first enter the Expense Categories Code (10) followed by number sign (#); then the Currency Code for US dollars (53) followed by number sign; the amount, omitting the decimal point, followed by number sign; and the Payment Types code (1) followed by number sign.

After you've entered each expense item, the VRU will repeat your entry for your confirmation. Press 1 to approve as spoken. Press 2 to change the entry. Press 3 to end the voucher. Please listen for any special instructions that may follow.

Fig. 22A

METHOD AND SYSTEM FOR PROCESSING EXPENSE VOUCHERS

FIELD OF THE INVENTION

This invention relates to methods and system for processing expense vouchers submitted by persons claiming travel expenses, for example, from an employer.

BACKGROUND OF THE INVENTION

Typically, in large companies which may have offices in many locations throughout a country or countries, each office or accounting centre has dedicated employees, systems, equipment and information systems which are used in the process of reimbursing employees for expenses incurred on business trips or the like.

Typically, employees submit a paper copy of an expense report to an employee receivable processing location. Often such paper copies are generated on a computer, using a spreadsheet. Such expense reports are typically reviewed and audited by an employee receivables group, depending upon the dollar amounts of the expense reports. Usually, such expense reports are keyed into a computer by employee receivable staff, for entry into a travel management system. Generally, all expense reports must have a review signature prior to the employee receiving reimbursement. The keying of the expense report by employee receivable staff is a duplication of effort and inefficient. The need for a review signature requires coordination with the person authorized to provide a review and is unnecessary where the expense amounts incurred are relatively small.

Often, different offices will have different levels of modernization. Some may have the capability for direct deposit, while most manually sign cheques, stuff envelopes, sort by location, prepare packages for mailing and distribute cheques in-house by various methods such as by cashiers, volunteers, or inter-office mail. Usually, only a small percentage of such cheques are mailed to an employee's home. Often where a direct deposit is made, a suitable notification is sent to the employee by one of the above methods. In any event, company resources are required to deliver the reimbursement or notification of the reimbursement to the employee.

With the above method of handling an expense report, considerable time passes before the employee receives reimbursement. Yet, where an employee has incurred expenses on behalf of the company on a credit card, the employee is required to make a payment to the credit card issuer before a pre-determined date. Sometimes with existing procedures, the employee may not receive reimbursement before the pre-determined date, which could cause the employee to unnecessarily incur interest charges.

The storage of expense reports and receipts also typically varies from office to office. Often reports and receipts are stored in storage boxes, although some are microfilmed. Nevertheless, there is usually no standard format for storage.

What would be desirable therefore, is a system and procedure for handling expense reports to expedite the act of submitting expenses, to expedite review of expense reports, to expedite payments to employees, to facilitate a common storage regime, and to consolidate resources associated with the processing of expense reports in a single location. The present invention address this need.

SUMMARY OF THE INVENTION

In accordance with one aspect of the invention, there is provided a method of processing expense reimbursement claims supported by at least one receipt associated with identifying indicia. The method includes defining in memory, an expense voucher record having a charge field for identifying an entity incurring expenses, an expense field for identifying expenses incurred by the entity, and a voucher identification field. The voucher identification field is loaded with a first code associated with the identifying indicia. The contents of the charge field and the expense field are compared with corresponding reference data, according to pre-defined verification criteria to determine whether or not the contents of the charge field and the expense field meet the verification criteria. Upon meeting the pre-defined verification criteria, the expense voucher record is associated with a position in a receipt required list. The physical presence of the at least one receipt is detected and a second code associated with the identifying indicia is produced in response thereto. The receipt required list is then searched to locate a corresponding voucher record having a first code matching the second code. When a corresponding voucher record is located, a payment record is added to a payment list, the payment record including the contents of the voucher identification field, the charge field and the expense field of the expense voucher record.

Preferably, the method includes the steps of maintaining a plurality of expense fields for storing expense amounts associated with different categories of expenses and calculating a sum total of expense amounts stored in the expense fields. Preferably, the method includes the step of, identifying a currency in which the expense amounts were incurred, receiving currency exchange rates for currencies identified and using the currency exchange rates to convert the expense amounts into common currency values prior to calculating the sum total.

Preferably the step of associating includes the step of placing the receipts in a container having the identifying indicia, the identifying indicia including a barcoded voucher number on the container.

Preferably, the method includes producing a storage record having a field for storing the voucher number identified by the indicia, a scan date field for storing the date on which the indicia is read, and a storage code field for storing a storage code identifying a storage location associated with the supporting receipts.

Preferably, the method includes the step of removing the association of the corresponding voucher record with the receipt required list.

Preferably, the method includes the step of transmitting to a payment service provider, the payment list.

Optionally, the method may include the step of identifying the expense voucher record as requiring review and associating a review field and a review date field with the expense voucher record. The review field is then read upon finding a corresponding expense voucher record. Preferably then, the method includes the step of determining whether the review field has contents equal to a pre-defined value and if so, associating the expense voucher record with a manager processing queue and storing in the review date field a value indicative of a date on which the expense voucher record was reviewed.

Preferably, the method includes the step of presenting to the user a menu of expense categories and a data entry format. The step of presenting may include presenting an audio menu at a remote telephone and storing in the charge field, expense field and voucher identification field respectively, data entered by a user at a keypad of the remote telephone. Or, the step of presenting may include presenting a visual menu at a video display terminal.

Preferably, the step of defining in memory is performed at a first user terminal.

Preferably, the method includes the step of transmitting the expense voucher record to a central server.

In accordance with another aspect of the invention, there is provided a computer-readable storage medium on which is stored a plurality of computer-readable codes operable to direct a computer to process expense reimbursement claims supported by at least one receipt associated with identifying indicia. The codes direct the computer to define in memory, an expense voucher record having a charge field for identifying an entity incurring expenses, an expense field for identifying expenses incurred by the entity, and a voucher identification field. The codes further direct the computer to load the voucher identification field with a first code associated with the identifying indicia and compare the contents of the charge field and the expense field with corresponding reference data, according to pre-defined verification criteria to determine whether or not the contents of the charge field and the expense field meet the verification criteria. Upon meeting the pre-defined verification criteria, the codes are operable to direct the computer to associate the expense voucher record with a position in a receipt required list. The codes then direct the computer to detect the physical presence of the at least one receipt and produce a second code associated with the identifying indicia in response to detecting the physical presence of the receipt. The codes then direct the computer to search the receipt required list to locate a corresponding voucher record having a first code matching the second code and when a corresponding voucher record is located, add a payment record to a payment list, the payment record including the voucher identification field, the charge field and the expense field of the expense voucher record.

Preferably, the codes are operable to direct the computer to maintain a plurality of expense fields for storing expense amounts associated with different categories of expenses and to calculate a sum total of expense amounts stored in the expense fields. Preferably, the codes identify a currency in which the expense amounts were incurred, receive currency exchange rates for currencies identified and use the currency exchange rates to convert the expense amounts into common currency values prior to calculating the sum total.

Preferably, the codes are operable to direct the computer to produce a storage record having a field for storing the voucher number identified by the indicia, a scan date field for storing the date on which the indicia is read, and a storage code field for storing a storage code identifying a storage location associated with the supporting receipt.

Preferably, the codes are operable to direct the computer to remove the association of the corresponding voucher record with the receipt required list.

Preferably, the codes are operable to direct the computer to transmit to a payment service provider, the payment list.

Optionally, the codes are operable to direct the computer to identify the expense voucher record as requiring review and associate a review field and a review date field with the expense voucher record. The review field is then loaded upon finding a corresponding expense voucher record. Preferably then, the codes are operable to direct the computer to determine whether the review field has contents equal to a pre-defined value and if so, associate the expense voucher record with a manager processing queue and store in the review date field a value indicative of a date on which the expense voucher record was reviewed.

Preferably, the codes are operable to direct the computer to present to the user a menu of expense categories and a data entry format. The codes may be operable to direct the computer to control a voice response unit to present an audio menu at a remote telephone and store in the charge field, expense field and voucher identification field respectively, data entered by a user at a keypad of the remote telephone. Or, the codes may be operable to direct the computer to present a visual menu at a video display terminal.

Preferably, the codes are operable to direct the computer to transmit the expense voucher record to a central server.

In accordance with another aspect of the invention, there is provided a system for processing expense reimbursement claims supported by at least one receipt associated with identifying indicia. The system includes computer readable memory, in which is defined an expense voucher record having a charge field for identifying an entity incurring expenses, an expense field for identifying expenses incurred by the entity, and a voucher identification field. The system further includes a computer in communication with the memory, for loading the voucher identification field with a first code associated with the identifying indicia, comparing the contents of the charge field and the expense fields with corresponding reference data, according to pre-defined verification criteria to determine whether or not the contents of the charge field and the expense field meet the verification criteria and upon meeting the pre-defined verification criteria, associating the expense voucher record with a position in a receipt required list. The computer further detects the physical presence of the at least one receipt and produces a second code associated with the identifying indicia in response to detecting the physical presence of the receipt. The computer further searches the receipt required list to locate a corresponding voucher record having a first code matching the second code and when a corresponding voucher record is located, adds a payment record to a payment list, the payment record including the contents of the voucher identification field, the charge field and the expense field of the expense voucher record.

Preferably, the computer is operable to maintain a plurality of expense fields for storing expense amounts associated with different categories of expenses and calculate a sum total of expense amounts stored in the expense fields.

Preferably, the computer is programmed to identify a currency in which the expense amounts were incurred, receive currency exchange rates for currencies identified and use the currency exchange rates to convert the expense amounts into common currency values prior to calculating the sum total.

Preferably, the system includes a reader for reading a barcoded expense voucher number.

The computer may be programmed to define in the memory a storage record having a field for storing the voucher number identified by the indicia, a scan date field for storing the date on which the indicia is read, and a storage code field for storing a storage code identifying a storage location associated with the supporting receipts.

Preferably, the computer is programmed to remove the association of the corresponding voucher record with the receipt required list.

Preferably, the computer is programmed to transmit to a payment service provider, the payment list.

The computer may be programmed to identify the expense voucher record as requiring review and may be programmed to associate a review field and a review date field with the expense voucher record. The computer may be programmed to read the review field upon finding a corresponding expense voucher record and may be programmed to determine whether the review field has contents equal to a pre-defined value and to associate the expense voucher record with a manager processing queue. The computer may further be programmed to store in the review date field a value indicative of a date on which the expense voucher record was reviewed.

Preferably, the computer is programmed to present to the user a menu of expense categories and a data entry format.

Optionally, the system may include a voice response unit controlled by the computer and preferably, the computer is programmed to present an audio menu to a remote telephone and to store in the charge field, expense field and voucher identification field respectively, corresponding data entered by a user at a keypad of the remote telephone.

Preferably, the system includes a video display terminal in communication with the computer and preferably, the computer is programmed to present a visual menu at the video display terminal.

In accordance with another aspect of the invention, there is provided a system for processing expense reimbursement claims supported by at least one receipt associated with identifying indicia. The system includes a computer network having a central server and a plurality of computer user terminals. Each of the user terminals has computer readable memory, in which is defined an expense voucher record having a charge field for identifying an entity incurring expenses, an expense field for identifying expenses incurred by the entity, and a voucher identification field, and a computer in communication with the memory for loading the voucher identification field with a first code associated with the identifying indicia, for comparing the contents of the charge field and the expense fields with corresponding reference data according to pre-defined verification criteria to determine whether or not the contents of the charge field and the expense field meet the verification criteria. When the contents of the charge and expense fields meet, the pre-defined verification criteria, the computer sends an identification of the expense voucher record to the central server. The central server is operable to define and maintain a receipt required list, and is operable to receive the identification of the expense voucher record and associate the expense voucher record with a position in the receipt required list. At least one of the terminals is operable to detect the physical presence of the at least one receipt and produce a second code associated with the identifying indicia in response to detecting the physical presence of the receipt. The central server is further operable maintain a payment list and is operable to search the receipt required list to locate a corresponding voucher record having a first code matching the second code and when a corresponding voucher record is located, produce a payment record and add the payment record to the payment list, a payment record including the contents of the voucher identification field, the charge field and the expense field of the expense voucher record.

BRIEF DESCRIPTION OF THE DRAWINGS

In drawings which illustrate embodiments of the invention,

FIG. 5e is a schematic diagram of a currency window produced by a currency module according to the first embodiment to the invention;

FIG. 5f is a currency history window produced according to the currency module;

FIG. 5h is an accounting period window produced by an accounting period module according to the first embodiment of the invention;

FIG. 5i is a general ledger account window produced by a general ledger account module according to the first embodiment of the invention;

FIG. 5j is an audit parameters window produced by an audit parameters module according to the first embodiment of the invention;

FIG. 5k is an audit parameter history window produced by the audit parameter module;

FIG. 5l is a system parameter window produced by a system parameter module according to the first embodiment of the invention;

FIG. 5n is a forms window produced by a forms module in accordance with the first embodiment of the invention;

FIG. 8 is a schematic diagram of an employee profile window according to the first embodiment of the invention;

FIG. 9 is a schematic diagram of an employee profile record according to the first embodiment of the invention;

FIG. 10 is a schematic diagram of an employee receivable profile record according to the first embodiment of the invention;

FIG. 11 is a schematic diagram of a user preferences menu according to the first embodiment of the invention;

FIG. 13a is a schematic diagram of a credit provider data table record according to the first embodiment of the invention;

FIG. 16 is a schematic diagram of a blank expense voucher window menu according to the first embodiment of the invention;

FIG. 17 is a schematic diagram of a voucher data record according to the first embodiment of the invention;

FIG. 19 is a schematic diagram of a voucher review summary window according to the first embodiment of the invention;

FIG. 20a is a schematic diagram of a manager review summary window according to the first embodiment of the invention;

FIG. 20c is a schematic diagram of a receipts detail window produced by the scanning module;

FIG. 21b is a schematic diagram of a window of a new employee voucher window produced by the voucher and audit inquiry module;

FIG. 21c is a voucher lookup window produced by the voucher and inquiry module;

FIG. 21d is a stored voucher search window produced by the voucher and audit inquiry module;

FIG. 21f is a employee profile window produced by an employee profile module according to the first embodiment of the invention;

FIG. 21g is an employee accounts window produced in accordance with the employee profile module;

FIG. 21h is a cash advances window produced by the employee profile module;

FIG. 21j is a cash receipts window produced by the employee profile module;

FIG. 21k is an adjustment summary window produced by the employee module;

FIG. 21l is an adjustment detail window produced by the employee profile module;

FIG. 21m is an employee profile comment window produced by the employee profile module;

FIGS. 22 and 22A depict a schematic diagram of a worksheet according to a second embodiment of the invention.

DETAILED DESCRIPTION

FIG. 1

Figure 1:
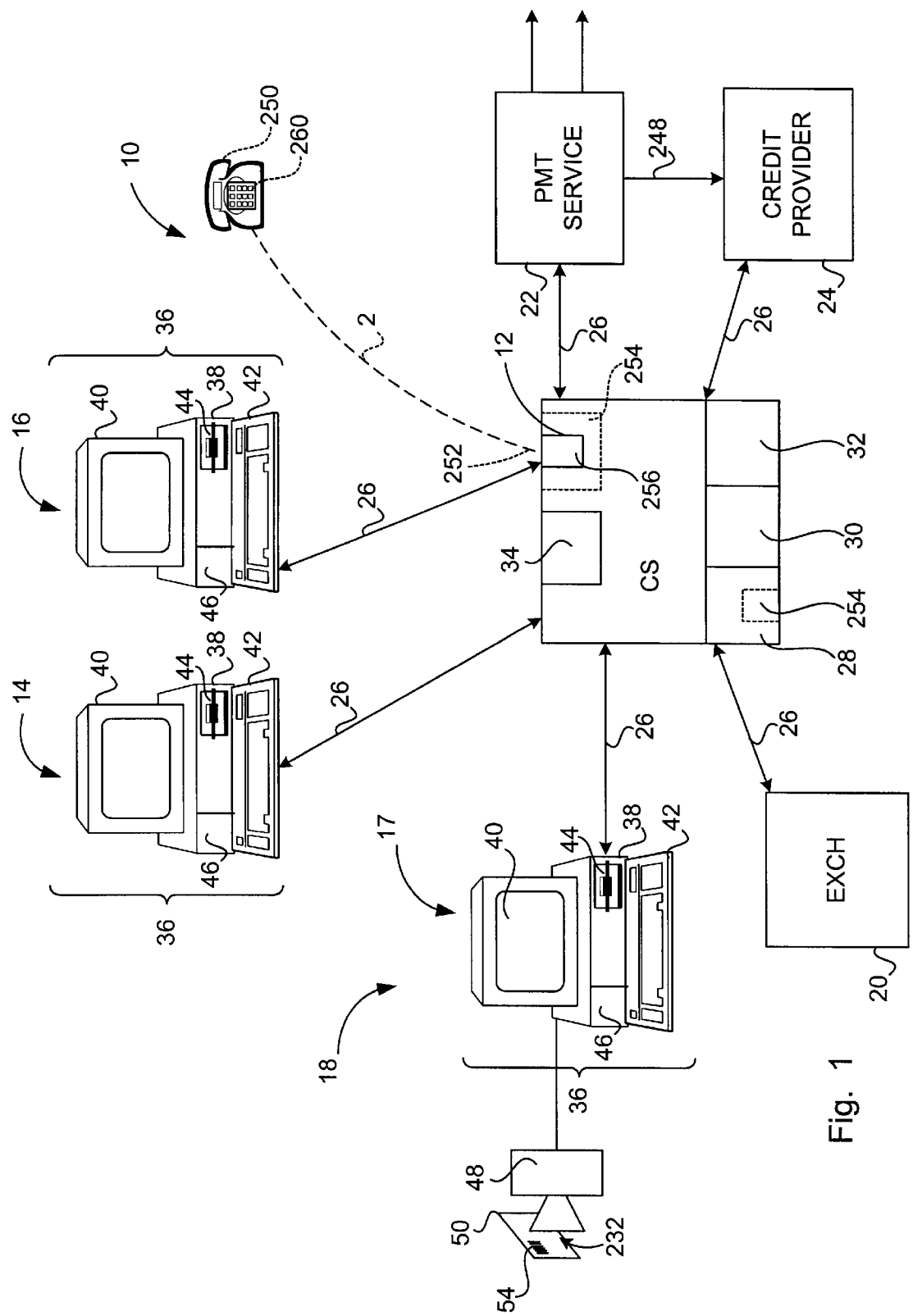
FIG. 1 is a block diagram of a system according to a first embodiment of the invention.

Referring to FIG. 1, a system according to a first embodiment of the invention is shown generally at 10.

The system includes a central server 12, a plurality of user terminals 14, 16, 17, a receipt-verifier 18, an exchange rate service provider 20, a payment service provider 22 and a credit service provider 24, all connected in communication with the central server by a wide area network including communications channels 26. The system acts to permit a user to incur expenses on a credit account with the credit service provider 24. When the user desires to be reimbursed for such expenses, the user submits an electronic expense voucher via one of the user terminals, 14, 16 a calculation of sums is performed at the user terminal using exchange rates provided by the exchange rate service provider 20, voucher data are verified according to pre-defined verification criteria, and the electronic expense voucher is stored at the central server 12 for later retrieval and review by a manager at one of the user terminals 14, 16. The manager reviews the expenses and allows the central server 12 to send an identification of the electronic expense voucher and an identification of the user to the payment service provider 22 which issues payment directly to the user's credit account with the credit provider 24 or issues payment directly to the user.

Central server 12

In this embodiment, the central server 12 includes a computing facility located in Research Triangle Park, North Carolina and includes a computer having program memory 28, data memory 30, a media reader 32 and a communications interface 34. In the program memory 28 is stored software for implementing an ORACLE7 (TM) database, an OMNIS 7 (TM) front end, an ORACLE REPORTS(TM) report writer and an SQL*Net (TM) corporate wide area network. The corporate wide area network and communications interface 34 provide the communications channels 26 permitting two way communications between the central server 12 and the user terminals 14, 16, the receipt verifier 18, the exchange rate service provider 20, the payment service provider 22 and the credit service provider 24.

User terminals

Each user terminal 14, 16, 17 includes a personal computer 36 having a processing unit 38, a video display 40 a keyboard 42 and a disk drive 44.

In this embodiment the personal computer 36 includes a MacIIci(TM) or better, 12 MB RAM if the Oracle Database version is less than 7.5 and 16 MB RAM if the Oracle Database version is greater than 7.5, and 15 MB available disk space. Alternatively, each user terminal may include a COMPAQ 486 (TM) 25 MHz computer with 12 MB RAM and 15 MB available disk space. The user terminals run RunTime Onmis7 (TM), version 3.1, SQL*NET (TM) Version 1.5.6.1.8, and associated libraries including InfoWindow (TM) and InfoWindow Navigator (TM).

The processing unit 38 includes a communications interface 46 for communicating with the central server 12. The InfoWindow program provides a user interface between the user and the central server 12 and includes a graphical user interface (GUI) which presents menus according to which the user can make functional selections.

Receipt Verifier

The receipt verifier 18 includes at least one of the user terminals 17 and a barcode reader 48, both of which are located at a processing centre, where accounting and administrative functions are performed.

Figure 2:
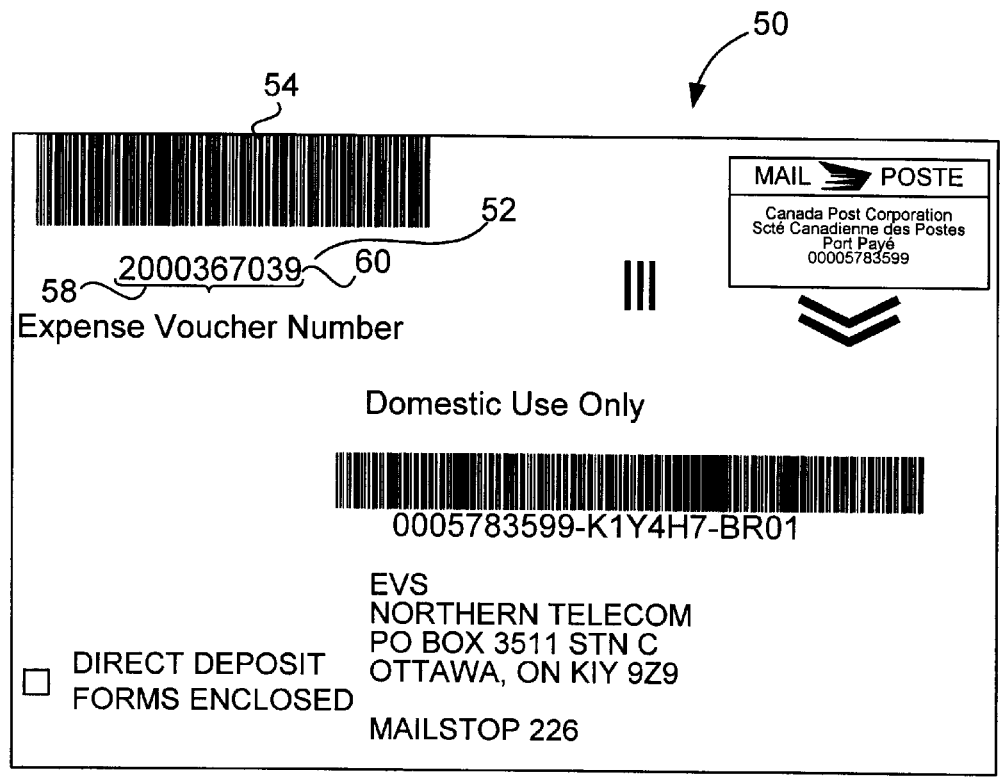
FIG. 2 is a schematic diagram of a front portion of an envelope according to the first embodiment of the invention.
Figure 3:
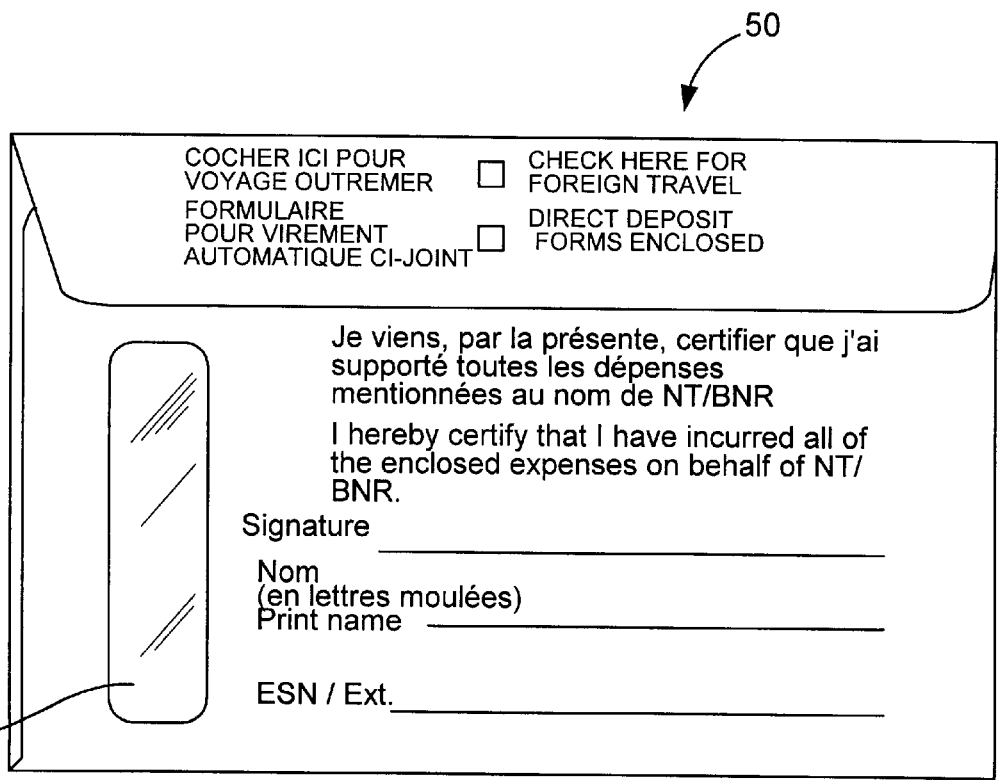
FIG. 3 is a schematic diagram of a rear portion of the envelope shown in FIG. 2.

FIGS. 2 and 3

Envelope

Referring to FIGS. 2 and 3, an envelope is shown generally at 50. To submit receipts, the receipts are placed in the envelope 50. The envelope has a voucher number 52, a barcode 54 and a window 56. In this embodiment, the voucher number 52 includes nine digits 58 and a check digit 60 calculated from the above nine digits 58, the check digit being calculated according to any conventional scheme. The barcode 54 is an encoded version of the voucher number 52. The window 56 allows processing centre personnel to determine whether or not at least one receipt is in the envelope, without opening the envelope. Thus the envelope acts as a container having indicia, in this embodiment a barcode identifying the voucher number associated with supporting receipts.

Referring back to FIG. 1, the barcode reader 48 at the processing centre is operable to read barcodes (54 in FIG. 2) on receipt envelopes to determine the voucher numbers. Thus, the barcode reader reads respective indicia from the container and the central server stores the voucher numbers so identified.

Figure 4:
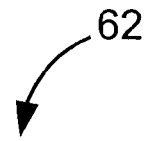
FIG. 4 is a schematic diagram of an electronic exchange rate file according to the first embodiment of the invention.

Exchange rate service provider
FIG. 4

The exchange rate service provider 20, in this embodiment is Nortel Corporate Services, Treasury Credit. Referring to FIG. 4, the exchange rate service provider provides to the central server (12 in FIG. 1) on a daily basis, an electronic exchange rate file shown generally at 62, containing a list of exchange rates, only two of which are shown at 64, and 66, for various currencies relative to a base currency. From this list exchange rates between any two currencies can be calculated.

Payment service provider

Referring back to FIG. 1, the payment service provider 22, in this embodiment, is Dunn and Bradstreet.

Program Modules

Referring back to FIG. 1, at the central server 12 the ORACLE7 (TM) database, OMNIS 7 (TM) front end, report writer and SQL*Net (TM) corporate wide area network are configured to comprise various program modules which cooperate to effect the functionality of the system. Generally, these modules reside at the central server 12 and the RunTime Onmis7, SQL*NET, InfoWindow and InfoWindow Navigator software at the user terminals cooperate to call up from the central server 12 the program modules or at least portions of the program modules which are run locally at the user terminals.

FIG. 5b

Figure 5A:
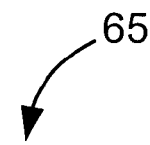
FIG. 5a is a schematic diagram of a payment record according to the first embodiment of the invention.
Figure 5B:
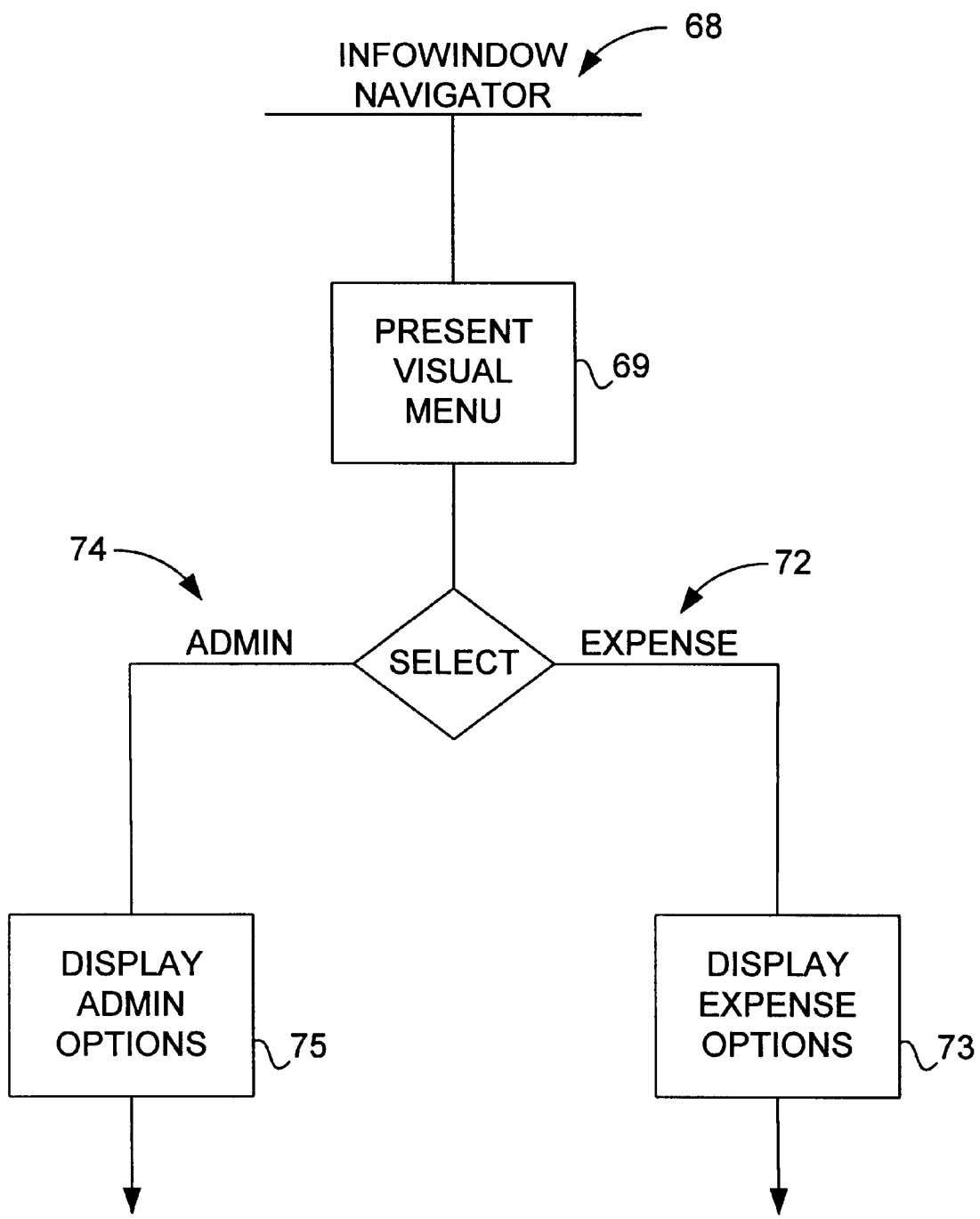
FIG. 5b is a flowchart of a program for selecting an administration or expense option in a program according to the first embodiment of the invention.
Figure 6A:
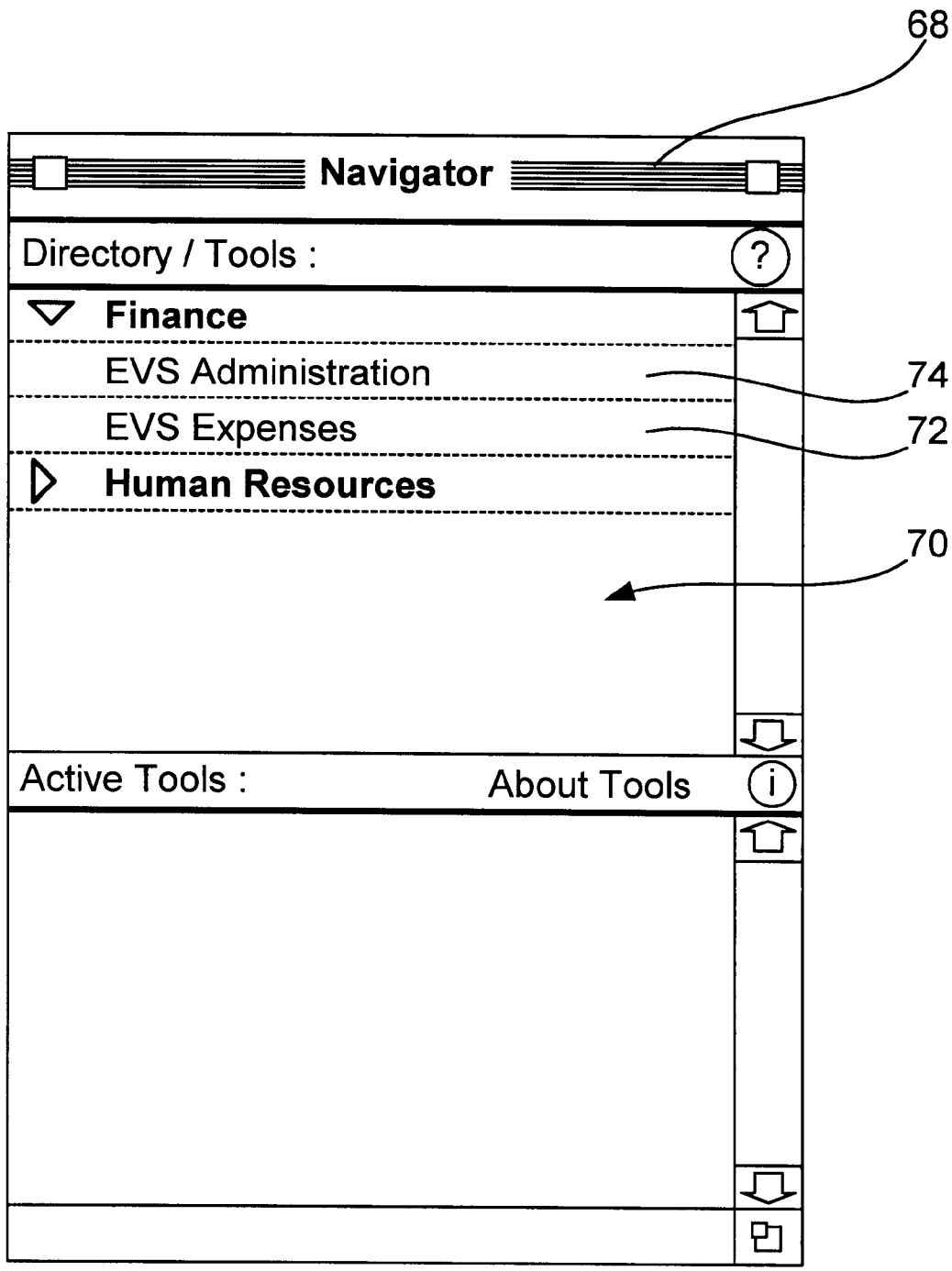
FIG. 6a is a schematic diagram of a visual menu presenting administration expense options to a user at a user terminal according to the first embodiment of the invention.

Referring to FIG. 5b, at any of the user terminals, the user invokes the InfoWindow Navigator 68 which includes a routine 69 presenting to the user a visual menu 70, shown in FIG. 6a, of functional options including an employee voucher system (EVS) expense option 72 and an EVS administration option 74. The expense option 72 is accessible by all employees while the administration option 74 is available only to processing centre personnel.

Admin option

Figure 5C:
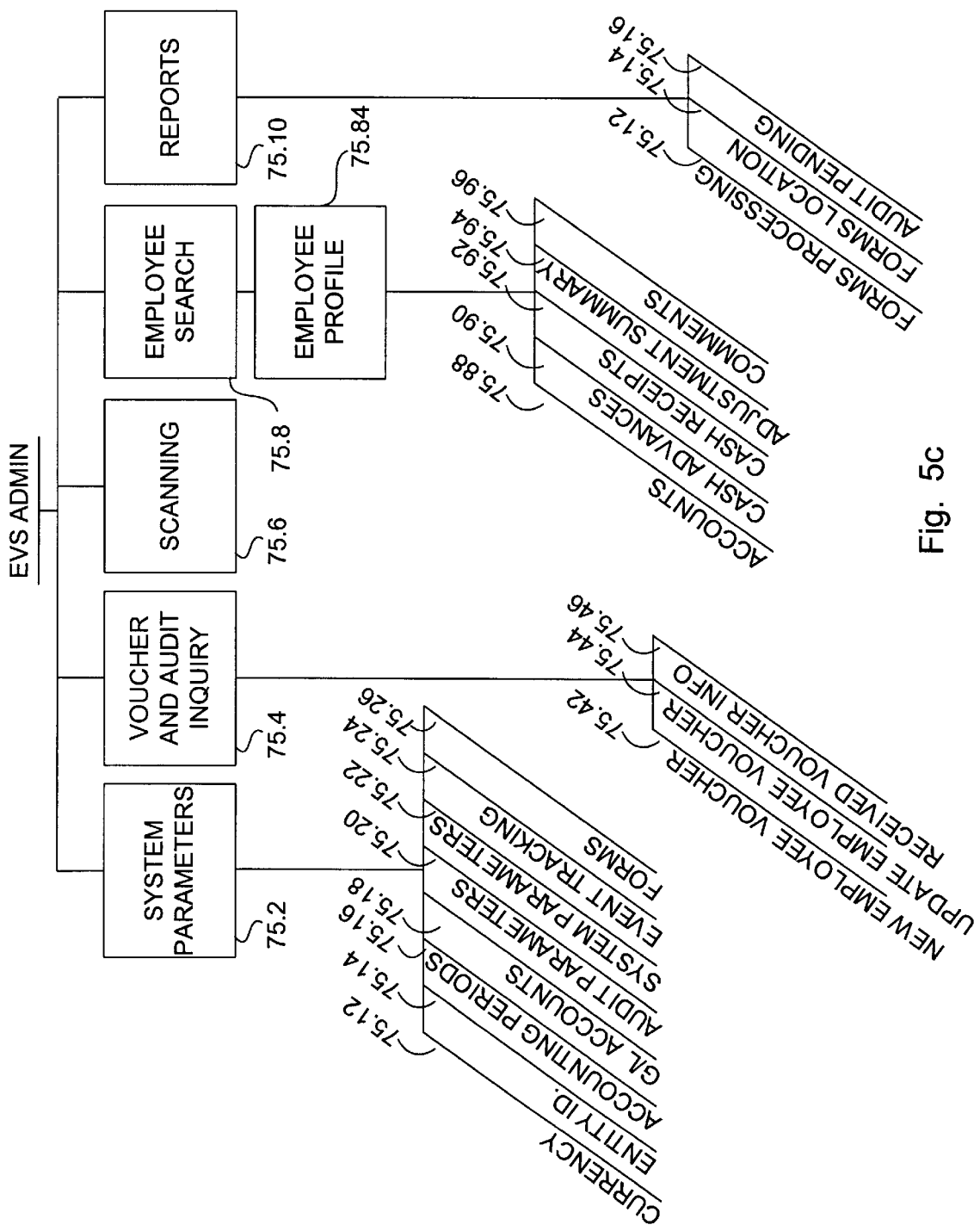
FIG. 5c is a block diagram of program modules under the administration option.

Referring to FIG. 5b, on selecting the administration option a display admin options module 75 is invoked, which presents to the user a visual display (not shown) of various options available to administrative personnel. Referring to FIG. 5c, under the administrative option the user may invoke a system parameters module 75.2, a voucher and audit inquiry module 75.4, a scanning module 75.6, an employee search module 75.8, and a reports module 75.10.

System parameters

Figure 5D:
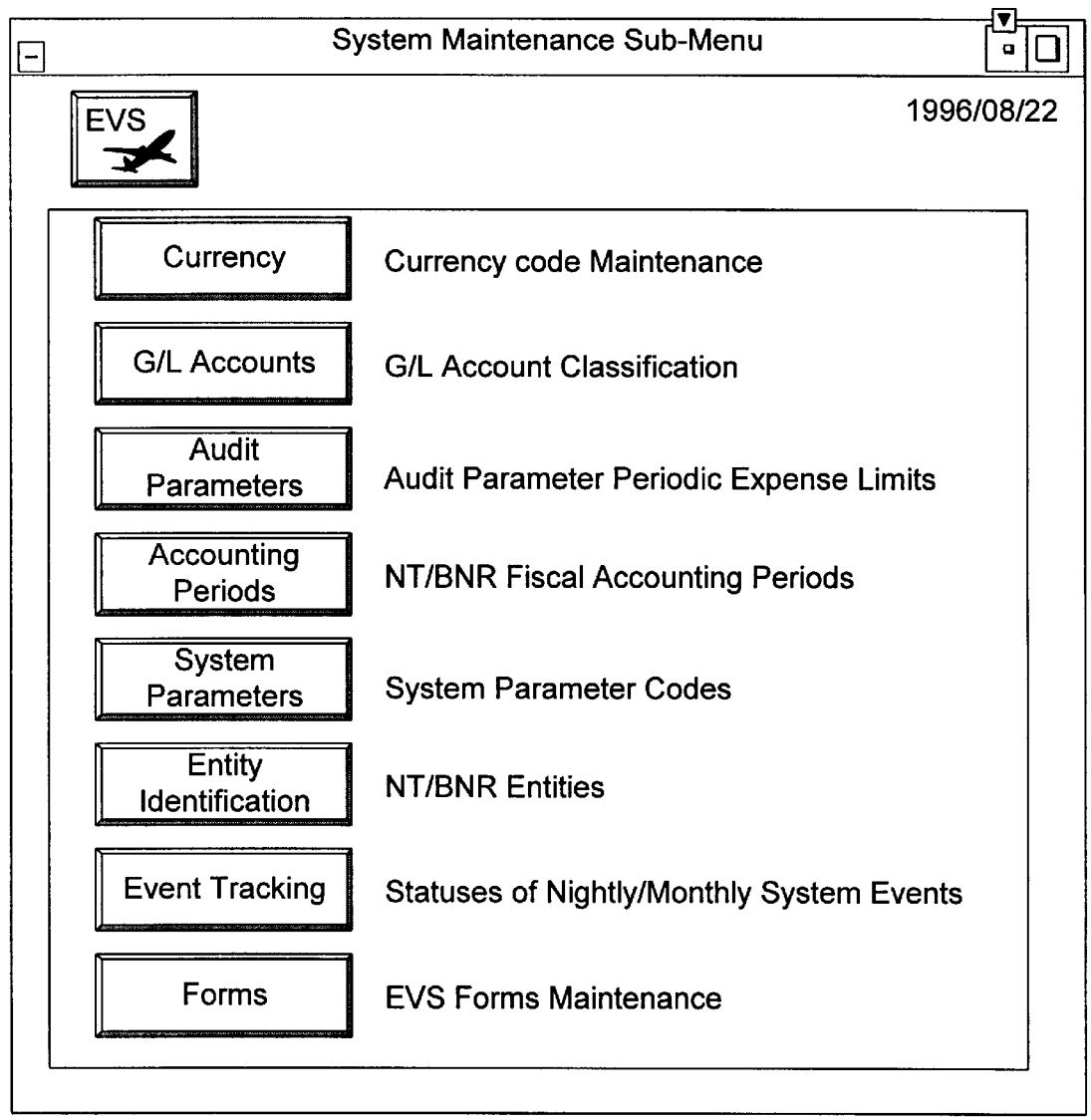
FIG. 5d is a schematic diagram of a visual menu produced by a system parameter module according to the invention.

The system parameters module 75.2 is operable to present to the user a system maintenance sub-menu as shown in FIG. 5d. Referring to FIGS. 5c and 5d, the user may invoke sub-modules including a currency sub-module 75.12, an entity id sub-module 75.14, an accounting periods sub-module 75.16, a G/L accounts sub-module 75.18, an audit parameters sub-module 75.20, a system parameters sub-module 75.22, an event tracking sub-module 75.24, and a forms sub-module 75.26.

Referring to FIG. 5d, icons bearing the names of the aforementioned modules are displayed to the user to permit the user to select a particular sub-module.

The currency sub-module 75.12 displays a currency maintenance window 75.28 as shown in FIG. 5e. This module creates a RELCURCY table. The table includes fields for holding a "from" currency 75.30, in this case the currency of the United Arab Emirates, and a "to currency portion 75.32" with a field 75.34 for identifying a currency. It also includes a VRU field 75.36 for holding a code operable to control a voice response unit, a description field 75.38 for describing the currency, an exchange rate field 75.40 for holding an exchange rate between the from currency and the to currency, an effective date field 75.42 and an expiration date 75.44 for indicating periods during which the related currency has or had the indicated exchange rate. An exchange rate loading module (not shown) automatically links the fields of the currency maintenance window with exchange rates and effective dates derived from the currency exchange rate list 62 shown in FIG. 4.

Referring to FIG. 5f, there is also associated with the currency module, a currency history window shown generally at 75.46 which displays currency exchange rates between a "from" currency to a "to" currency for various date ranges.

Figure 5G:
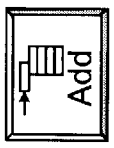
FIG. 5g is an entity id window produced by an entity id module according to the first embodiment of the invention.

Referring back to FIG. 5c, the entity id module 75.14 presents to the user an entity identification window 75.48 shown in FIG. 5g. The module cooperates with a BUS ENTITY table which links entity identification numbers with entity descriptions, entity types, currency types and status of the entity. The entity identification module essentially assigns entity codes and entity types to certain business entities within the corporation.

Referring back to FIG. 5c, the accounting periods module 75.16 produces an accounting periods window 75.50 as shown in FIG. 5h which cooperates with a BUSENTITY type table which associates entity types with accounting periods identified by year and month and with specific start and end dates to such accounting periods.

Referring back to FIG. 5c, the G/L accounts module 75.18 produces a G/L accounts window 75.52 shown in FIG. 5i. The module cooperates with a GLACCT table (not shown) which relates expense categories to G/L account numbers and G/L account status. In addition, it relates expense types with a particular department/project number and corporate entity. The user may specify a particular entity or department/project number and observe on the G/L accounts window 75.52 a list of the types of expenses associated with such entity and department/project, the associated G/L account number and associated G/L account status.

Referring back to FIG. 5c, the audit parameters module 75.20 produces an audit parameters window 75.54 as shown in FIG. 5j. This module cooperates with an EXPNSPERIOD LIMIT table and EXPNSCDGY table (not shown). The audit parameters window 75.54 displays expense categories such as car rental, cellular phone, etc., voucher type, expense periods such as weekly or each, currency such as United States dollars, a limit type, an expense limit such as $300 or $250 etc., and effective date from which expense limits apply and an expiration date upon which expense limits are no longer applicable. The audit parameters window 75.54 allows processing centre staff to set expense limits for various expense categories.

The audit parameters module further produces an audit parameter history winder 75.56 as shown in FIG. 5k, which displays audit parameter history information relating to particular expense categories. For example, if expense limits for taxi/parking/tolls are changed five times throughout a year, the audit parameter history window will show the limit values in effect during corresponding date periods.

Referring back to FIG. 5c, the system parameters module 75.22 produces a system parameters window 75.58, shown in FIG. 5l, which displays an identification of various parameters used in the system, with an indication of the type of parameter, the parameter code, the possible values of the parameter and effective expiration dates during which the parameter value is in effect. Thus, processing centre staff can alter parameter values as required.

Figure 5M:
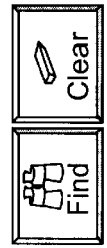
FIG. 5m is an event tracking window produced by an event tracking module according to the first embodiment of the invention.

Referring back to FIG. 5c, the event tracking module 75.24 produces an event tracking window 75.60 as shown in FIG. 5m, which allows processing centre staff to observe system messages produced by the system during the execution of various modules associated with the system. In effect, various modules are programmed to provide status information as to the execution of the module such status information appearing as an event record in an event log. Such event records are shown as items 450, 449, 438 and 419 in FIG. 5m.

Referring back to FIG. 5c, the forms module 75.26 produces a forms maintenance window 75.62 as shown in FIG. 5n, which presents an index of forms pre-entered into the system and retrievable by the user. The user may select a particular form and such form will be sent to the user via in-house mail.

Referring back to FIG. 5c, the system parameters module 75.2 and its related sub-modules, essentially pre-load and pre-configure the system to provide the desired functionality. The remaining modules 75.4, 75.6, 75.8 and 75.10 under the EVS admin option cooperate in the system after an electronic expense voucher has been created and, therefore, description of these modules will be deferred until after the following discussion of the EVS expense option.

Universal Employee Profile Data Table
FIG. 9

Referring to FIG. 9, at the time an employee is hired various employee information is loaded into a human resources database. This information is stored in respective fields which are linked together to form a universal employee profile data record. The relevant fields are as follows: Global Identification Number 90, Name 92, Address 94, Department number 96, Entity 98, Location code 100, Region 102, Internal Mail Stop 104, and Bank Account No. 106. This information is universal in that it is not peculiar to reimbursing the employee for expenses and is used in other applications such as payroll and corporate records.

Credit service provider and interface module

Referring back to FIG. 1, in this embodiment, the credit service provider 24 is American Express Inc. and Amex Bank of Canada.

Figure 13B:
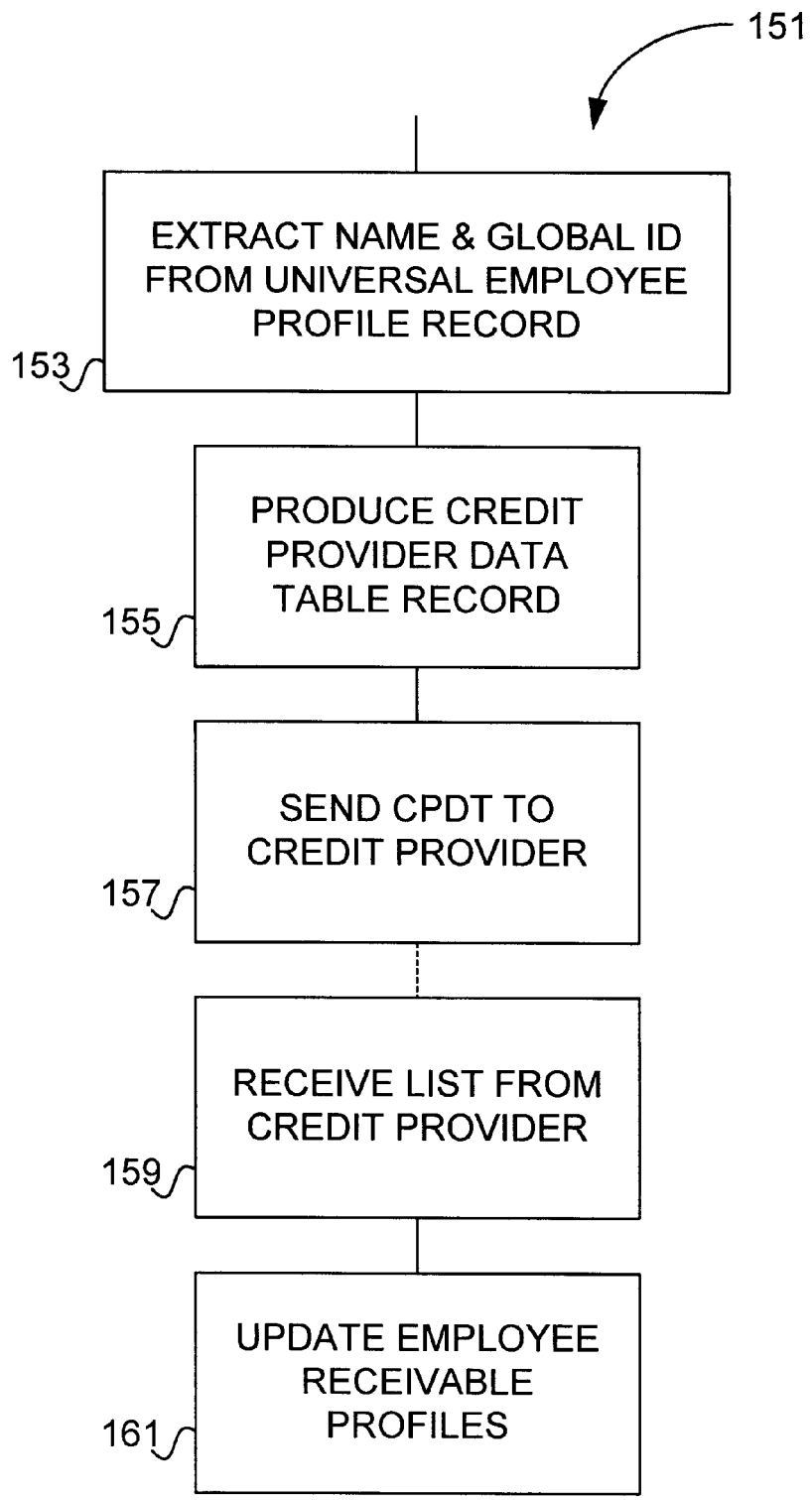
FIG. 13b is a flow chart of a credit provider interface module according to the first embodiment of the invention.

The system includes a credit provider interface module shown at 151 in FIG. 13b which is run exclusively by the central server 12 and which is not accessible from the user terminals 14, 16 and 17.

Employee Receivable Profile Data Table
FIG. 10

Referring to FIG. 10, an employee voucher profile record is further produced by linking further pre-defined fields, some of which are loaded with data by administrative personnel and some of which are loaded by an employee manager. Referring to FIG. 10, the employee receivable profile data record includes fields as follows: pay employee without receipts flag 110, Manager hold flag 112, Process Centre Hold flag 114, Alternate Mailing address 116, Alternate Bank Account No. 118, Manager review date 120, Processing centre review date 122, VRU Access flag 124, AMEX Card accounts 126, Permanent Advance 128, Temporary advance 130.

The process centre hold flag 114, alternate mail address, alternate bank account number 118, processing centre review date 122, VRU access flag 124, permanent advance 128 and temporary advance 130 are loaded with data supplied under the EVS admin option. The pay employee without receipts flag 110 and manager hold flag 112 and manager review date 120 are loaded with default values but may be changed by the manager review module 80 under the EVS expense option. The pay employee without receipts flag 110 is defaulted to "No" and the manager hold flag 112 is defaulted to "No". The AMEX. card accounts field 126 is loaded by the credit provider interface.
FIG. 13

Referring to FIGS. 13a and 13b, the credit provider interface module creates and maintains a credit provider data table for storing records 150 having fields for storing data relating to Global Identification Number 152, Employee name 154, credit Card Number 156 and other credit card information fields 158. Referring to FIG. 13b, when an employee is hired, block 153 extracts the employee's name 154 and global identification number 152 from the Universal employee profile record (89 in FIG. 9) and block 155 produces a credit provider data table record and stores it in the credit provider data table. Each day, block 157 communicates to the credit provider (24 in FIG. 1), new additions, changes and deletions to the credit provider data table. The credit provider responds with a list (not shown) of global identification numbers and associated new or cancelled credit card numbers. This list is received by block 159 of the credit provider interface module. Block 161 then links to the employee receivable profile 107 shown in FIG. 10, using global identification numbers and adds or deletes credit card numbers from corresponding credit card account number fields 126, according to the list received from the credit provider.

Figure 6B:
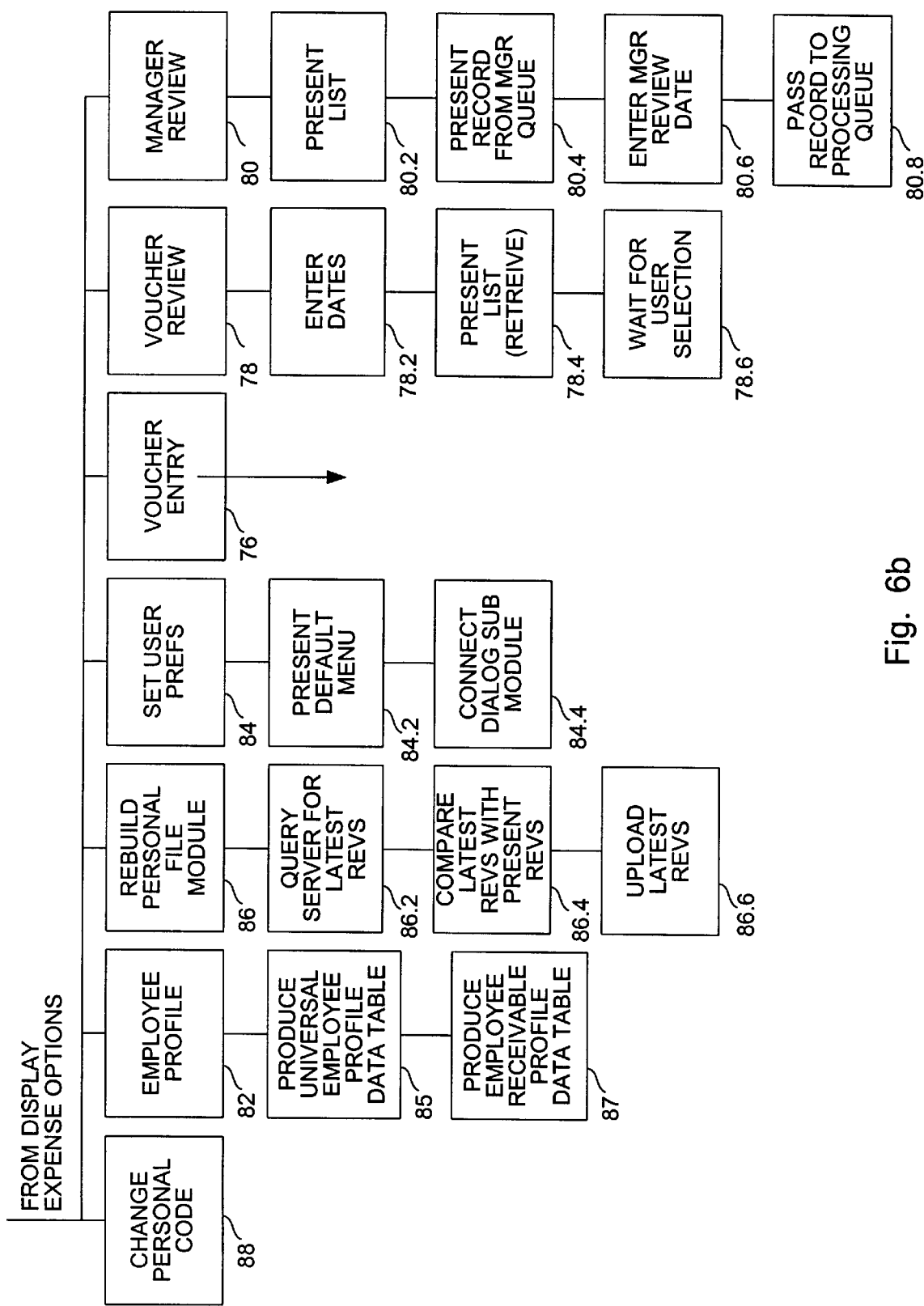
FIG. 6b is a schematic diagram of various modules associated with expense option.
Figure 7:
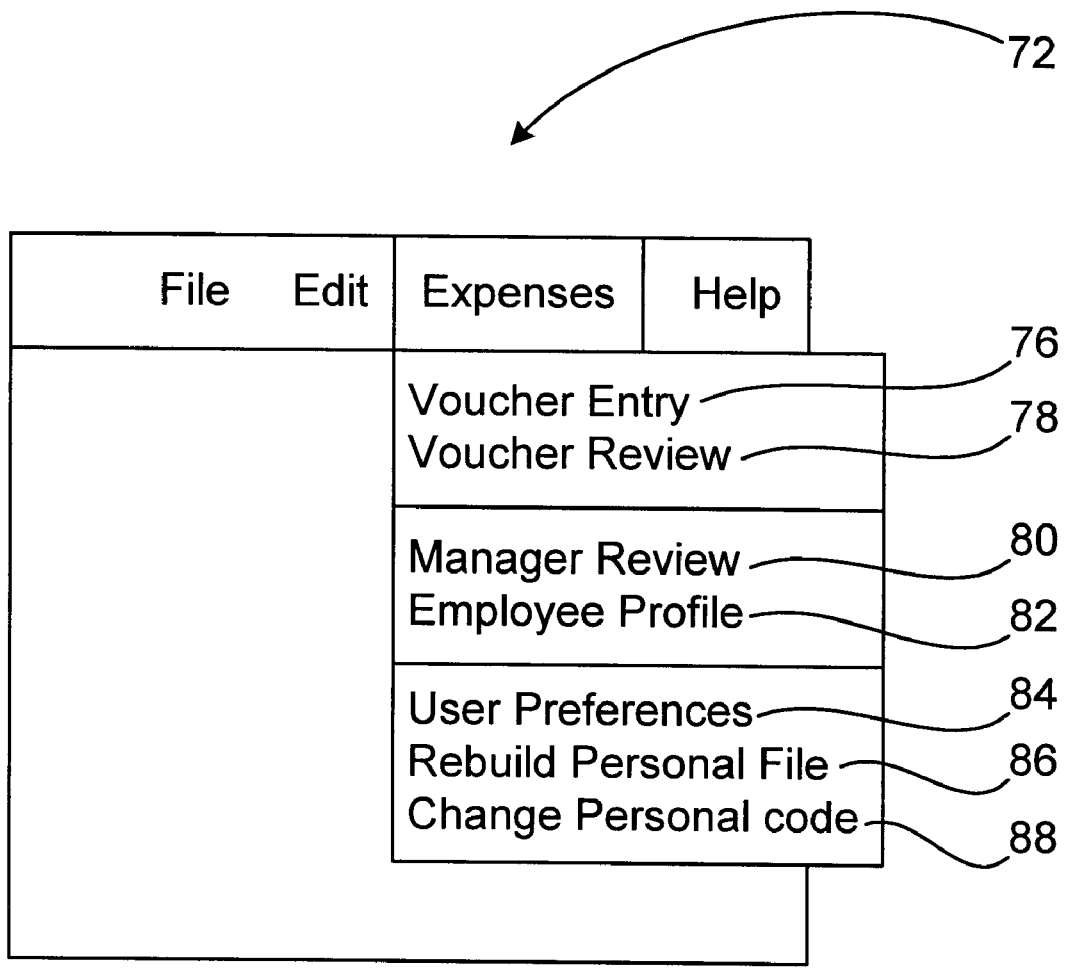
FIG. 7 is a schematic diagram of an expense sub-menu according to the first embodiment of the invention.

FIGS. 5b, 6b and 7
Expense option

Referring to FIGS. 5b, 6b and 7, under the expense option 72, a display module 73 presents the user with various further options, each of which is associated with a related program module and icon, including a voucher entry module and icon 76, a voucher review module and icon 78, a manager review module icon 80, an employee profile module and icon 82, a user preferences module and icon 84, a rebuild personal file module and icon 86 and a change personal code module and icon 88. Selecting any of the icons in the menu of FIG. 7 invokes the program modules by the same names, shown in FIG. 6b.

Change personal code module

The change personal code module 88 is activated from the change personal code icon and allows the user to set or change a password or personal code used to gain access to the information used by the system. The password or personal code acts as a security feature for preventing unauthorized access to system information.

Employee Profile Module

Referring FIGS. 6b and 8, the employee profile module 82 is activated from the employee profile icon and includes an employee profile sub-module 85 operable to direct a user terminal to allow a user to modify the universal employee profile data table shown in FIG. 9. Referring to FIG. 8, the employee profile sub-module presents to the user an employee profile window with indicia 83 identifying fields which can be changed. In this embodiment, the user may change the home address and alternate address fields.

Rebuild Personal File Module

Referring back to FIGS. 6b and 7, at each logon to the expenses option, a query module 86.2 queries the central server (12 in FIG. 1) to determine the latest versions of the program modules. A compare module 86.4 then compares the latest versions with the versions of modules already installed at the user terminal and if different, the user is presented with an option to update the current versions. If the user chooses to update, an upload module 86.6 makes a request of the central server 12 to upload the latest versions of outdated modules and replaces such outdated versions with the latest versions.

User Preferences Module

Still referring to FIGS. 6b and 7, the user preferences module 84 has a plurality of sub-modules which allow the user to enter expense item preferences such as incurred currency, payment type, department number and entity code.

FIG. 11

Referring to FIGS. 6b and 11, the user preferences module 84 has a present default module 84.2 which presents to the user a menu 132 including a default selection 134 which, when selected causes the module to link to the universal employee profile shown in FIG. 9 on the global identification number and display the contents of fields associated therewith.

The user can set preferences such as the department number field 140 and entity code 142 to values reflecting the department and entity to which expenses are to be attributed, if different from the department number and entity codes already entered at the employee profile menu shown in FIG. 8.

FIG. 12

Connect dialog

Figure 12:
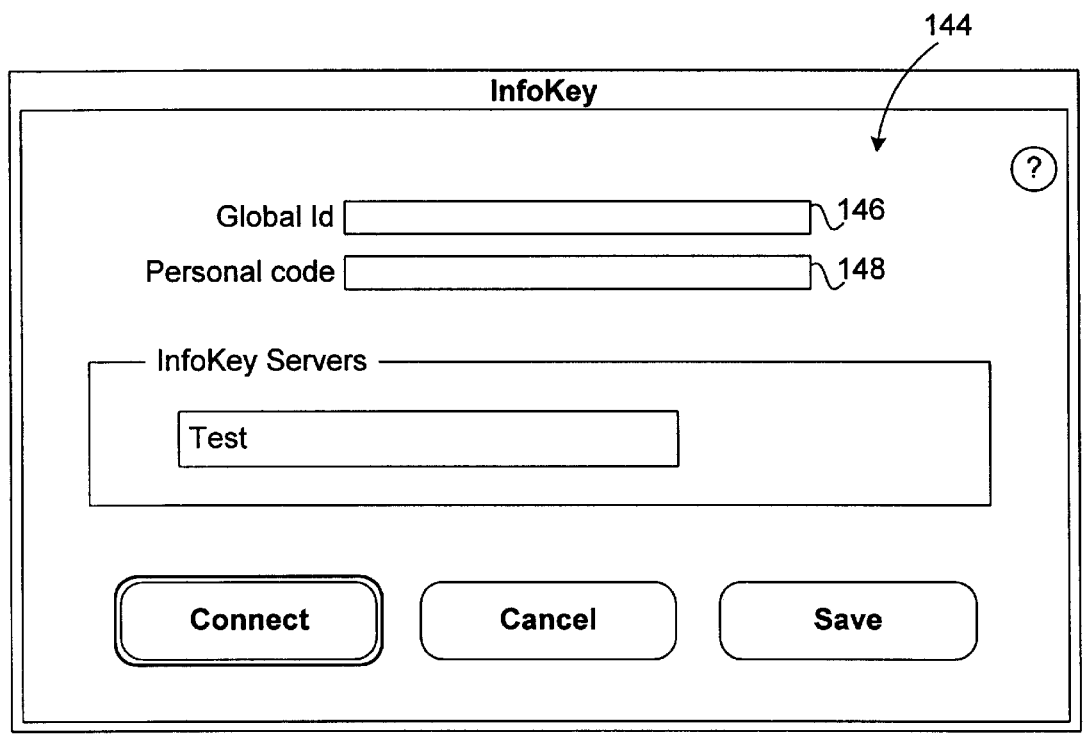
FIG. 12 is a schematic diagram of a connect dialogue menu according to the first embodiment of the invention.

Referring to FIGS. 6b and 12, after setting the default values, or user preferences, a connect dialogue sub-module 84.4 is invoked which presents a menu 144 with prompts 146 and 148 prompting the user for his/her global id number and a personal passcode. The entered global id number and passcode are compared with the logon id number and logon passcode respectively and if equal, the user preferences are permanently stored.

Voucher Entry Module

Figure 14:
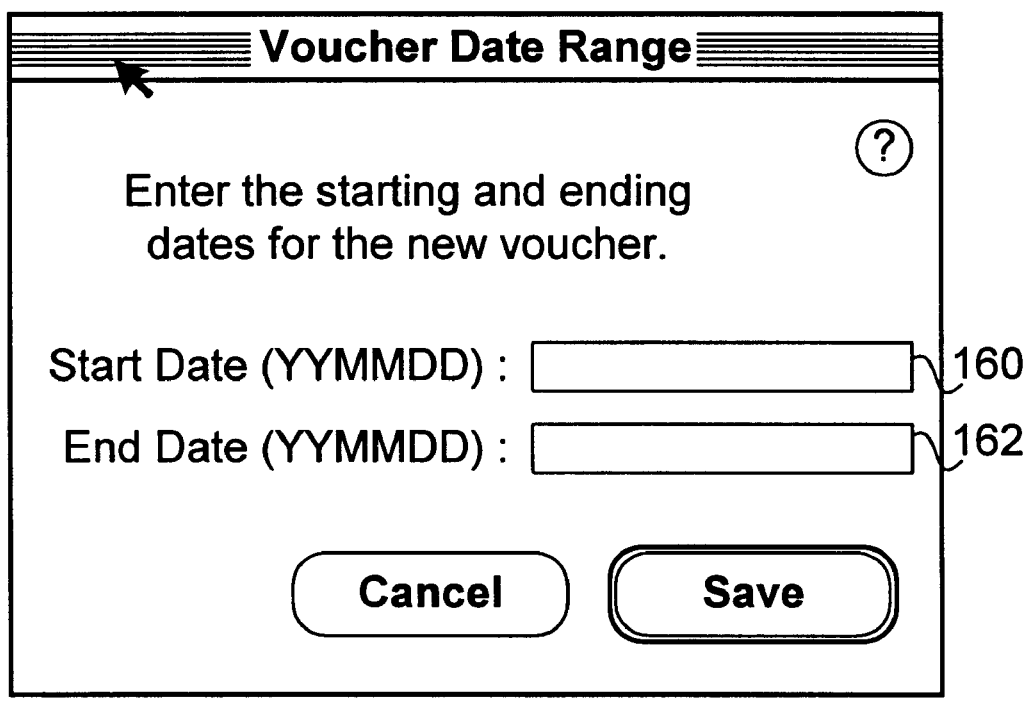
FIG. 14 is a schematic diagram of voucher date range menu according to the first embodiment of the invention.
Figure 15:
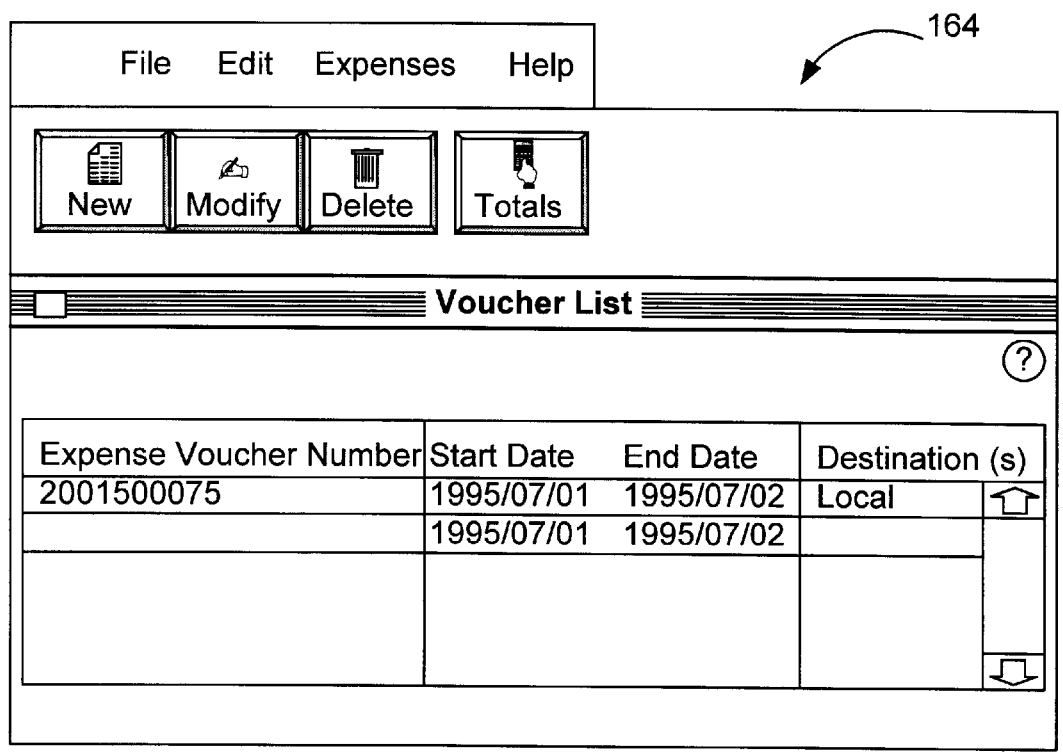
FIG. 15 is a schematic diagram of a voucher list window according to the first embodiment of the invention.

FIGS. 14, 15, and 16

Referring back to FIGS. 6b, 7 and 13c, the voucher entry icon 76 invokes the module by the same name. Within the voucher entry module, a date entry block 76.2 prompts the user, as shown in FIG. 14, to enter start and end dates 160, 162 of a date period during which expenses were incurred. A further block 76.4 determines if the user has entered at least one other expense voucher previously, and if so, a list module 76.6 presents a list of previously submitted expense vouchers, as shown at 164 in FIG. 15. Referring back to FIG. 13c, if the user has not previously entered a voucher, a blank module 76.8 presents a new expense voucher menu as shown at 166 in FIG. 16.

FIG. 17

Figure 13C:
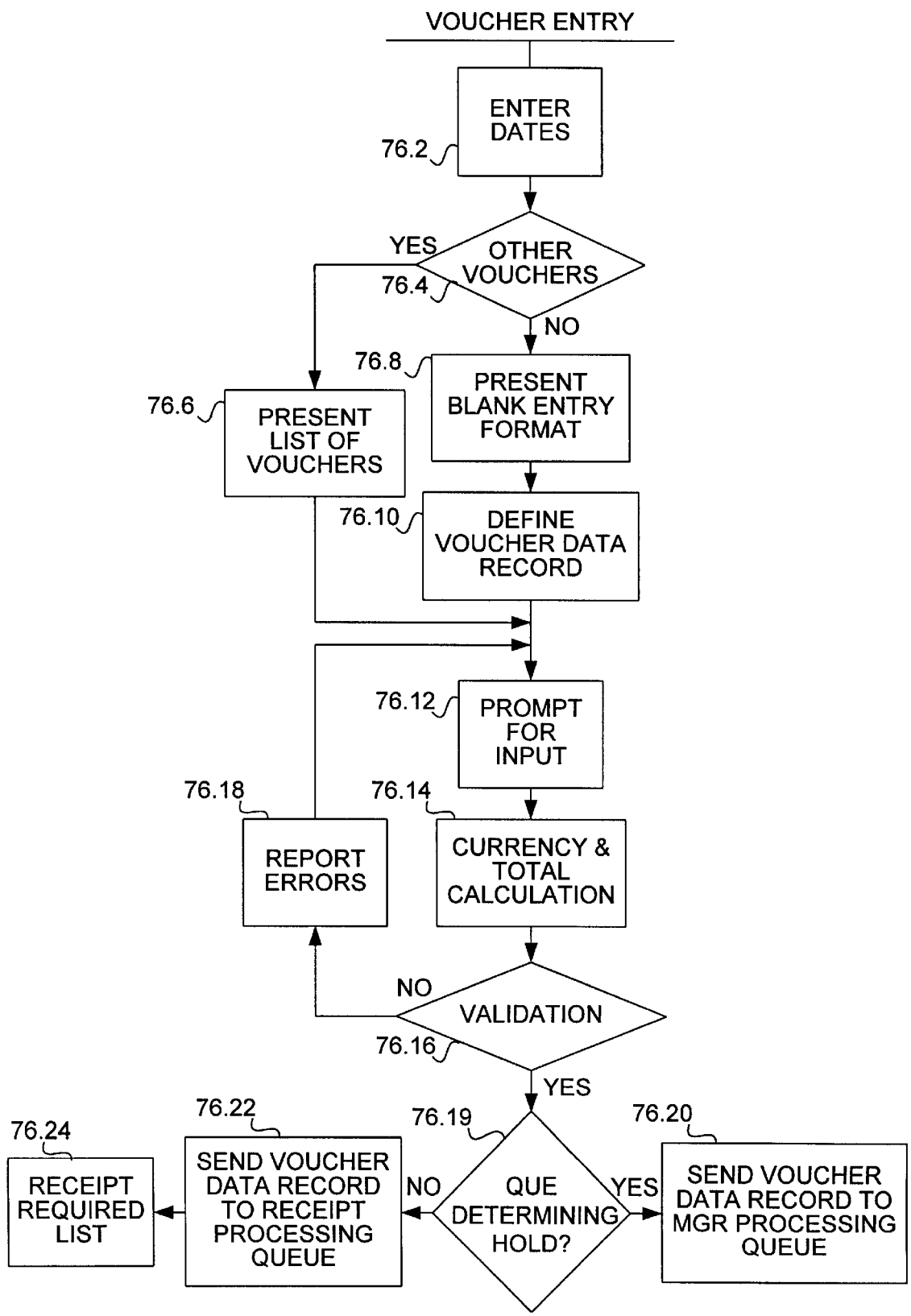
FIG. 13c is a flowchart of a voucher entry module according to the first embodiment of the invention.

Referring to FIGS. 13c and 17, upon presenting a blank new expense voucher, a voucher definition block 76.10 defines, in data memory at the user terminal, a voucher data record 167 including fields for storing information relating to expenses claimed. The fields are broadly categorized as being either header 180 or expense fields 182. The header 180 fields include the following: Global Identification Number 184, Voucher No. 186, Purpose of expense 188, Destination 190, From/to dates of expenses 192, entity/project being charged or "charged" field 194, spousal travel 196, currency 198, and payment type 200. The expense fields 182 include the following: Airfare 202, Car rental 204, Taxi/Parking 206, Ground Transport 208, Hotel 210, Meals 212, Telephone 214, Entertainment 216, Conference 218, and Other 220. Thus, the user is presented with a menu of expense categories and a data entry format.

The global identification number is determined by the user logon and is automatically entered into the Global identification number field 184. The start and end dates of the date period during which expenses were incurred are automatically entered into the From/to dates of expenses fields 192 as entered by the user during execution of the date entry block 76.2.

The purpose of expense field 188 and destination field 190 are text fields entered by the user. The entity/project being charged field 194, the currency field 198 and the payment type field 200 are linked to the fields by the same names in the user preferences module. The spousal travel indicator 196 is entered by the user.

Referring back to FIGS. 13c and 16, a prompt module 76.12 prompts the user for the voucher number 186, spouse travel indicator 196, destination 190, and purpose 188 information which is entered by the user in the form of keystrokes. Referring back to FIG. 2, recall that the voucher number 52 is indicated by the nine digits 58 and one check digit 60 on the receipt envelope 50. These digits are entered by the user and are stored by the voucher entry module in the voucher identification field 186.

Referring back to FIGS. 13c and 16, the user is permitted to enter expense information, in any of the expense categories indicated by icons 222. The expense categories are pre-defined under the G/L account module 75.52, a window of which is shown in FIG. 5i. Each icon has a corresponding field in the voucher data table of FIG. 17. To enter expense categories, the user selects one of the expense icons 222 and enters, in a line, the value of the related expense, an indication of the currency in which the expense was incurred, if different from the default currency and an indication of payment type if different from the default payment type. It will be appreciated that each line may be for expenses incurred in a different currency and may have a different payment type. For example the user may designate expenses incurred in cash to be reimbursed by cheque and expenses incurred on credit to be paid directly to the credit provider.

In effect therefore, the user defines in memory, an expense voucher record having a charge field for identifying an entity incurring expenses, an expense field for identifying expenses incurred by the entity, and a voucher identification field for associating the expense voucher record with supporting receipts. In this example, the entity incurring expenses is the user.

Calculation

After all expense lines have been entered, the user selects a total function 224 which invokes a currency calculation sub-module 76.14. The currency calculation sub-module then reviews the currency indicators associated with each expense amount and makes requests to the central server 12 to access the exchange rates shown in FIG. 5e. The central server 12 provides the requested exchange rates and the currency calculation sub-module calculates monetary values for each expense category in the currency in which payment is to be made. The currency calculation sub-module then calculates totals for each expense category and for the voucher as a whole.

Thus, the expense voucher record has a plurality of expense fields for storing expense amounts associated with different categories of expenses. A currency in which the expense amounts were incurred is identified, currency exchange rates are received and the currency exchange rates of currencies identified are used at the user terminal to convert the expense amounts into common currency values. A sum total of all expenses is then calculated in a common currency.

Validation

After calculating totals, a validation sub-module 76.16 is automatically run which compares the contents of the entity field (194 in FIG. 17), department/project number (96 in FIG. 9), dollar amounts etc. with known entity codes, department/project numbers and pre-defined limits for expense category totals as set under audit parameters module 75.54 window shown in FIG. 5*j*. If the voucher field entries do not satisfy the validation criteria, the voucher is not validated, and an error reporting module 76.18 reports errors to the user who then has the opportunity to amend the voucher as required, to correct the errors. In effect, at least the contents of the charge field and the expense fields are compared with corresponding reference data or known values, according to pre-defined verification criteria which, in this example, is whether or not the contents of the charge field match a known identification number to which expenses are authorized to be associated and whether or not the contents of the expense fields are below certain pre-authorized limits.

If the contents of the entity field 194 and department number field (96 in FIG. 9) identify valid entities and departments and if the expense category totals are below pre-defined values set by the processing centre, the voucher is considered to be validated.

Queues

A queue determining module 76.19 then refers back to the employee receivable profile shown in FIG. 10, by indexing on the voucher number. The queue determining module 76.19 then reviews the manager hold flag field 112 of the employee receivable profile and if the hold flag is set to "Yes", a manager processing queue module 76.20 sends an identification of the voucher ie., the voucher number to a manager processing queue.

Alternatively, if the manager hold flag is set to "No" inactive, a receipt processing queue module 76.22 sends the voucher number to a receipt required list 76.24. Thus, upon meeting the pre-defined verification criteria, the expense voucher record is positioned in a receipt required list.

After having sent a voucher to the manager processing queue or the receipt required list at the central server 12, the user exits whereupon a prompt is presented to remind the user to save the voucher and submit to the processing centre an envelope as shown in FIGS. 2 and 3, containing receipts supporting the user's claim for expenses.

Voucher Review Module

Referring back to FIGS. 6*b* and 7, the voucher review icon 78 is operable to invoke the voucher review module.

FIG. 18

Figure 18:
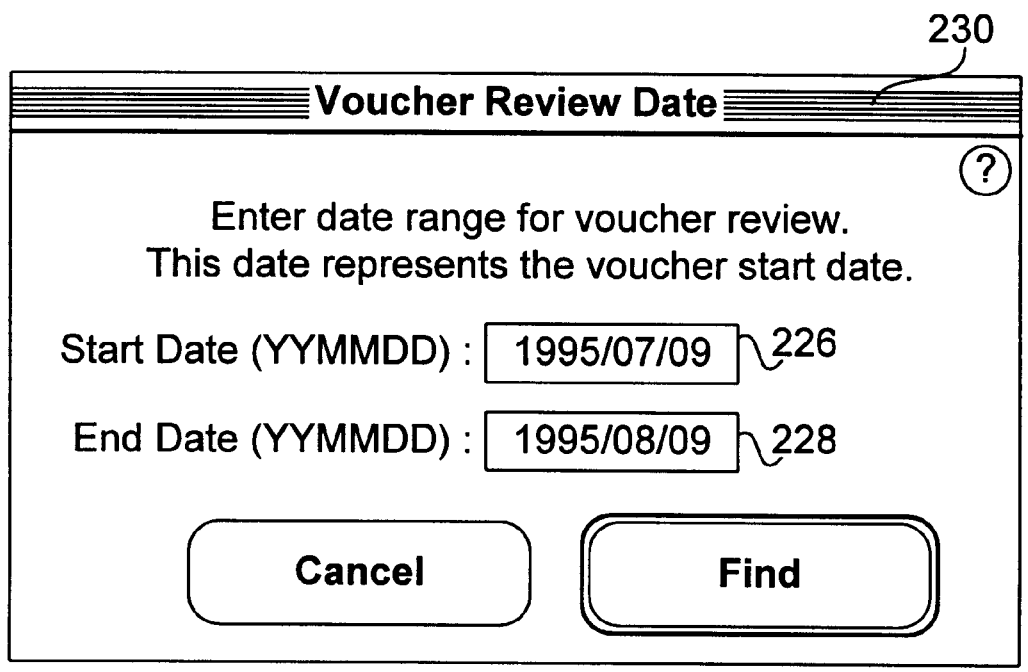
FIG. 18 is a schematic diagram of a voucher review date menu according to the first embodiment of the invention.

Referring to FIGS. 6*b* and 18, the voucher review module 78 includes a data module 78.2 which presents to the user a menu 230 with a request for entry of start and end dates 226 and 228 to define a date range. Upon entry of these dates, a retrieve module 78.4 retrieves from the central server 12 all voucher records associated with the user's global id number having from/to dates in the from/to date fields within the specified date range.

FIG. 19

Referring to FIGS. 6*b* and 19, the retrieve module 78.4 then presents a review summary window 210 which lists the retrieved vouchers and related status. A wait module 78.6 then waits until the user selects any of the listed vouchers for a detailed review in a format similar to that in which the voucher was entered. Processing then continues at block 76.12 in FIG. 13*c* as described above.

Manager Review Module

Referring back to FIGS. 6*b* and 7, a person designated as a manager has the option to select the manager review option to invoke the manager review sub-module 80 from the expenses menu. A present list block 80.2 then retrieves from the central server 12 a list of yet to be reviewed voucher records obtained from the manager's processing queue or summaries of various information as specified by the manager, as shown at 242 in FIG. 20*a*.

A present record block 80.4 then permits the manager to select and view a voucher record in a format similar to that used by the employee for creating the record, or in other formats specified by the manager. Referring back to FIGS. 6*b* and 10, after having reviewed a voucher, a review date block 80.6 prompts the manager to enter a review date which is stored in the manager review date field 120 of the employee receivable record 107. A pass block 80.8 then places the voucher record in the receipt required list at the central server 12. Thus, at least a portion of the expense voucher datafile is presented for review whereupon, an acknowledgement is received to indicate that the expenses have been reviewed. A review indicator is then associated with the expense voucher record via the manager review date field 120 in the employee receivable profile record 107 to indicate that the expense voucher record has been reviewed and placed on the required list.

At the processing centre 18, processing centre staff select the administration option 74, shown in FIG. 5*b* and invoke the scanning module 75.6 shown in FIG. 5*c*.

FIG. 20*b*

Scanning module

Figure 20B:
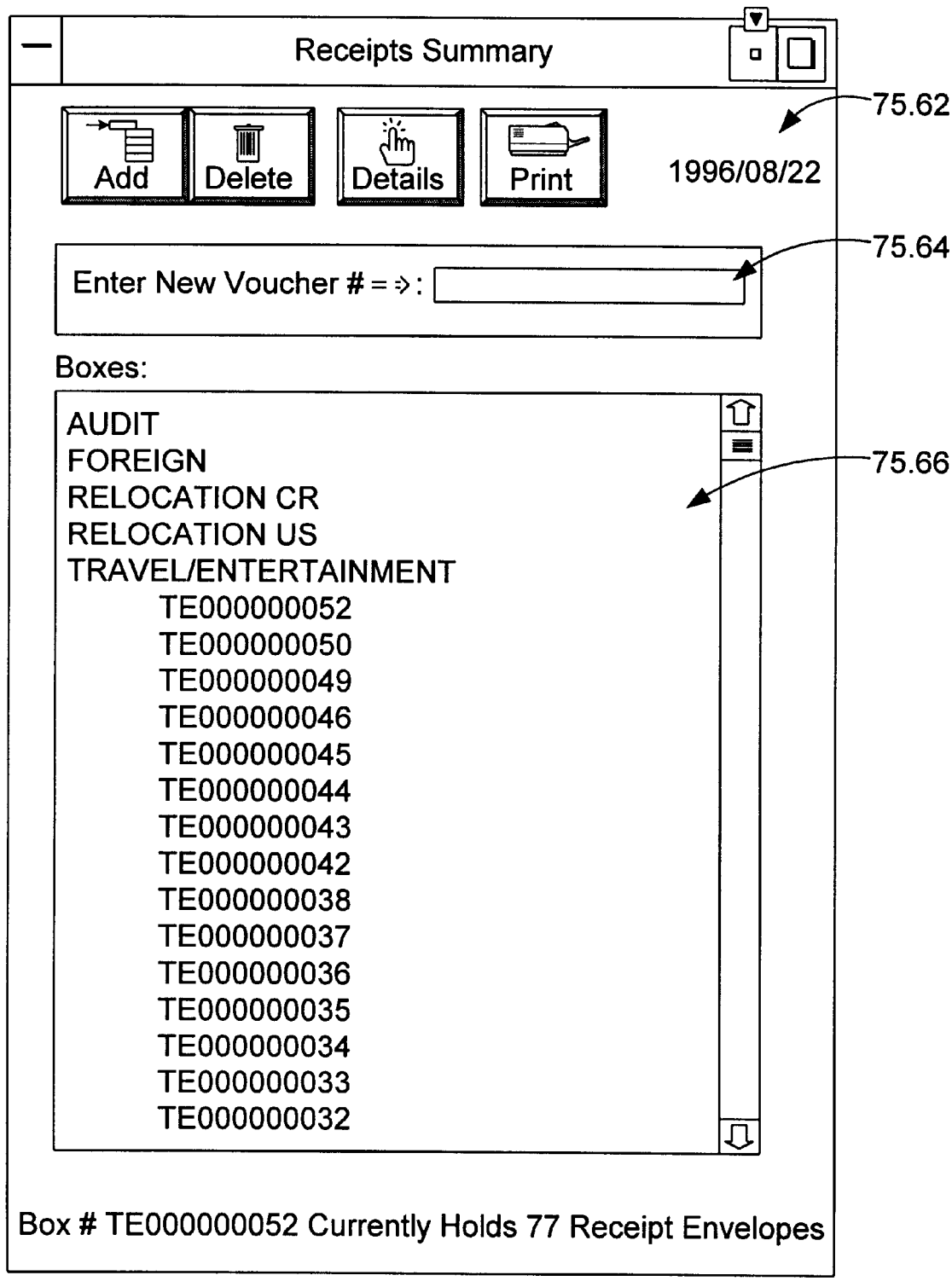
FIG. 20b is a schematic diagram of a receipts summary window produced by a scanning module according to the first embodiment of the invention.

Referring to FIG. 20*b*, the scanning module presents a scanning window 75.62 having a new voucher number prompt 75.64. In addition, the window 75.62 includes a listing 75.66 of storage boxes in which receipts may be stored.

Referring to FIGS. 1 and 20*b*, having invoked the scanning module, processing centre staff pass an envelope 50 in the field 232 of the barcode reader 48. If the barcode reader successfully reads the barcode on the envelope, the voucher number is determined from the barcode is recorded in response to the new voucher number prompt 75.64. If the barcode reader is not able to read the barcode, the user may enter the voucher number manually using the computer's keyboard.

The scanning module allows successive scanning of envelopes until a maximum number of envelopes allotted to a storage box is achieved. This number, of course, will depend on the size of the storage box and, in this embodiment, a box capable of holding 77 envelopes was used.

Referring to FIG. 20*c*, after a voucher number is scanned, the scanning module searches the receipt required list for a corresponding voucher number. Upon locating a corresponding voucher number, the global id field of the corresponding voucher record is read and used to look up, in the universal employee profile, the name of the person associated with such global id number. The employee global id number and name are copied into corresponding fields 75.68 and 75.70 in storage records shown on respective horizontal lines of the window shown in FIG. 20*c*. Each storage record also includes a voucher identification field 75.72, a first scanned by field 75.74 a first scanned on field 75.76 and a storage location field 75.78. The voucher identification field is completed with the voucher number of the envelope just read. The "first scanned by" field is completed automatically by the scanning module, the contents being determined by the name of the operator associated with the global id used at login to the processing centre terminal. The "first scanned on" field is completed by the scanning module and is determined by a time keeping function at the processing centre terminal. The date on which the envelope is scanned is recorded in this field. The storage location field is automatically completed by the scanning module, in accordance with a pre-defined sequence of numerical identifiers for identifying storage boxes. Thus, a separate storage record is produced for each envelope and voucher. The receipt records form a storage list as shown in FIG. 20*c*.

Thus, a storage record is produced, the storage record having a field for storing the voucher number identified by the indicia, a scan date field for storing the date on which the indicia is read, and a storage code field for storing a storage code identifying a storage location associated with the supporting receipts.

In addition, upon locating a matching voucher number in the receipt required list, the scanning module also produces a payment record as shown in FIG. 5*a*. A payment list comprised of a plurality of payment records is thus cumulatively formed.

Thus, the contents of the voucher identification field are compared with a receipt required list of voucher numbers to locate a corresponding voucher number in the receipt required list and when a corresponding voucher number is located, a payment record is added to a payment list, the payment record including the contents of the voucher identification field, the charge field and the expense field of the expense voucher record.

Payment service provider interface

Referring back to FIG. 5*a*, the system further includes a payment service provider interface sub-module (not shown) which runs exclusively at the central server. The payment service provider sub-module formats the payment list including employee names, employee addresses, modes of payment, Voucher numbers, AMEX card numbers, payment amounts and Employee bank account numbers to produce a payment file which is electronically transmitted to the payment service provider daily. Thus, a payment file comprised of payment records having fields identifying a payee and a payment amount is electronically transmitted to the payment service provider.

Referring back to FIG. 1, the user is paid by one of three methods. Where payment is to be made by cheque, the payment service provider 22 simply issues a cheque to the employee and dispatches it by regular mail to the employee. The payment file records are used to determine cheque payee information.

Where payment is to be made by direct deposit, the payment service provider 22 makes a direct transfer of funds into the employee's bank account. The payment file records also provide payee information for bank deposits.

Where payment is to be made to the credit provider 24, the amount of the payment is added to a cumulative total of payments to be made to the credit issuer and the employee's name and credit account number are added to a payment list of accounts to which credit is to be applied.

Each day, the payment service provider 22 electronically sends the payment file to the credit service provider 24 via a separate communications channel 248 and a direct transfer is made from the payment service provider 22 to the credit issuer 24 in the amount of the cumulative total. The credit issuer then credits the accounts listed in the payment list accordingly.

Voucher and audit inquiry

Figure 21A:
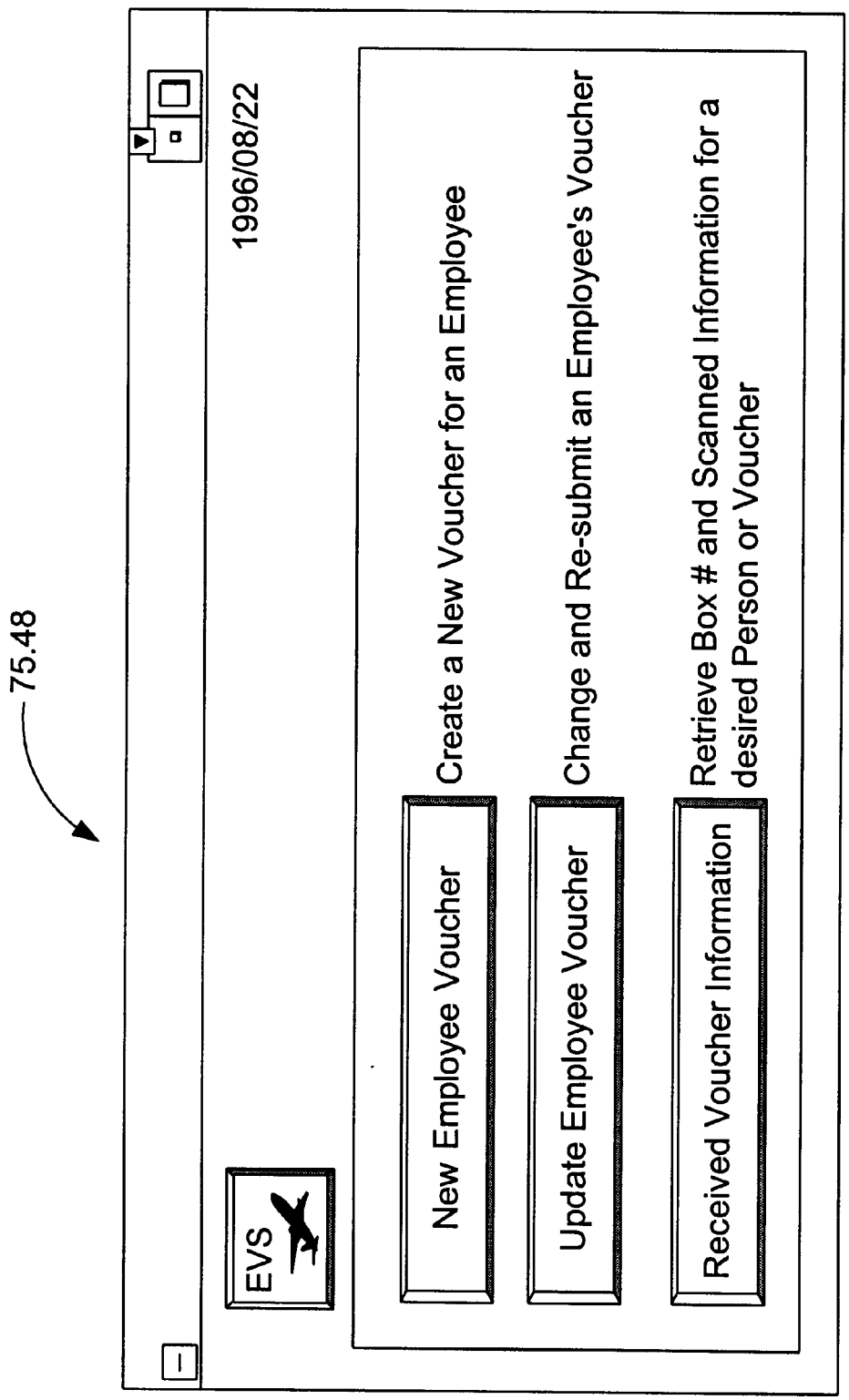
FIG. 21a is a schematic diagram of a menu produced by a voucher and audit inquiry module according to the first embodiment of the invention.

Referring back to FIG. 5*c*, under the EVS admin option, the voucher and audit inquiry module 75.4 has three sub-modules. These include a new employee voucher module 75.42 an update employee voucher 75.44 and a received voucher information module 75.46. A menu presenting these options is shown generally at 75.48 in FIG. 21*a*.

New employee voucher

Figure 21B:
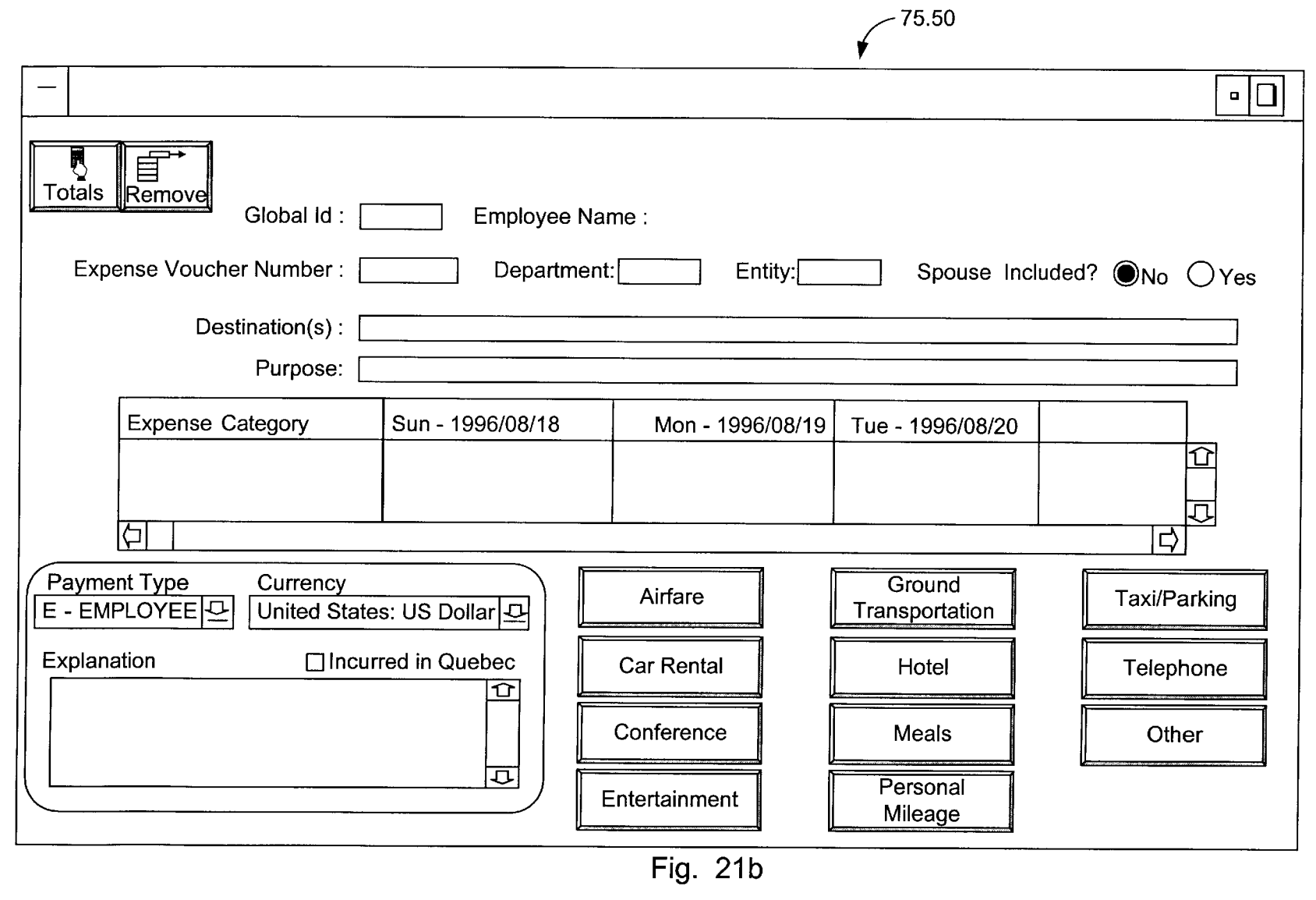

Referring to FIG. 21*b*, the new employee voucher sub-module (75.42) presents to the processing centre staff a window shown generally at 75.50 having a format similar to that used by the employee to enter a voucher. This permits the processing centre staff to add a voucher as shown in FIG. 16.

Update employee voucher

Referring to FIG. 21*c*, the update employee voucher module (75.44) presents a window shown generally at 75.52. This window provides voucher lookup access and presents, for a given global id, a voucher number, a scan date, an audit date, a manager review date, a submission date, a voucher total and voucher status. Amounts displayed are derived from employee receivable profiles and corresponding electronic voucher records.

Received voucher information

Referring to FIG. 21*d*, the received voucher info sub-module (75.46) presents a window 75.54 at which, for a given global id number, displays the corresponding name, voucher number, storage box and person who scanned the envelope containing receipts. The information presented in this window is obtained from the storage list shown in FIG. 20*b*.

Employee search module

Figure 21E:
FIG. 21e is an employee search window produced by an employee search module according to the first embodiment of the invention.

Referring back to FIG. 5*c*, the employee search module 75.8 presents to the user a window 75.82 as shown in FIG. 21*e*. The module allows processing centre staff to enter search criteria, comprised of a combination of global id, government id, first name, last name and department number and causes matching records to appear in list form identifying the global id number, government id number, name, department, status and status date. The information obtained for display in the window 75.82 is obtained from the universal employee profile and human resources records.

When the list shown in FIG. 21*e* is presented to the user, the user may select one of the entries for display. This invokes an employee profile module shown schematically at 75.84 in FIG. 5*c*. Referring to FIG. 21*f*, the employee profile sub-module 75.84 presents to the user an employee profile window shown generally at 75.86 which facilitates detailed entry of all information included within the employee profile shown in FIG. 9. In addition, from this window, the user may select an accounts function 75.88, a cash advances option 75.90, a cash receipts function 75.92 and an adjustment summary function 75.94.

Comment

In addition, a comment function 75.96 is available to append comments to the employee profile.

Employee advances

Referring to FIG. 21*g*, the employee accounts function presents an employee accounts window 75.98 which displays bank accounts and AMEX accounts for a selected employee.

Cash advances

Referring to FIG. 21*h*, the cash advances module (75.90) presents a cash advances window 75.100 which allows processing centre staff to adjust amounts reimbursed to employees. For example, if the employee has a temporary assignment, the employee may be issued a temporary advance by direct deposit to his bank account.

Cash receipts

Figure 21I:
FIG. 21i is a cash receipt summary window produced by the employee profile module.

Referring to FIG. 21i, the cash receipts module (75.92) presents a cash receipts summary 75.102 which displays a list of cash payments made by the employee to the processing centre. In this matter, the processing centre may receive balances of advances, paybacks on overpayments and the like. Actual entries to the cash receipts summary are provided by a second window 75.104 shown in FIG. 21j. The processing centre personnel enter the adjustment type, adjustment description, payment type, payment amount, cheque number and payment currency.

Adjustment summary

Referring to FIG. 21k, the adjustment summary module (75.94) presents an adjustments summary window 75.106 which provides a list of cash advances and cash receipts associated with a particular employee.

Adjustment detail

Referring to FIG. 21l, an adjustment detail window is shown generally at 75.108 which lists a single entry from the adjustment summary listing shown in FIG. 21k, with further detail relating to department project number, entity, type of expense, adjustment description, adjustment reason, cheque number, voucher number and invoice number.

Employee comment

Referring to FIG. 21m, the employee comment option presents an employee profile comment window 75.110 which provides a date and time stamp and a text field for comment. The comment, along with the date and time stamp are associated with the employee profile to allow general comments to be added to an employee profile.

Reports

Referring back to FIG. 5c, under the EVS admin option, the reports module 75.10 includes three submodules. These include a forms processing module 75.12, a forms location module 75.14 and an audit pending module 75.16.

Figure 21N:
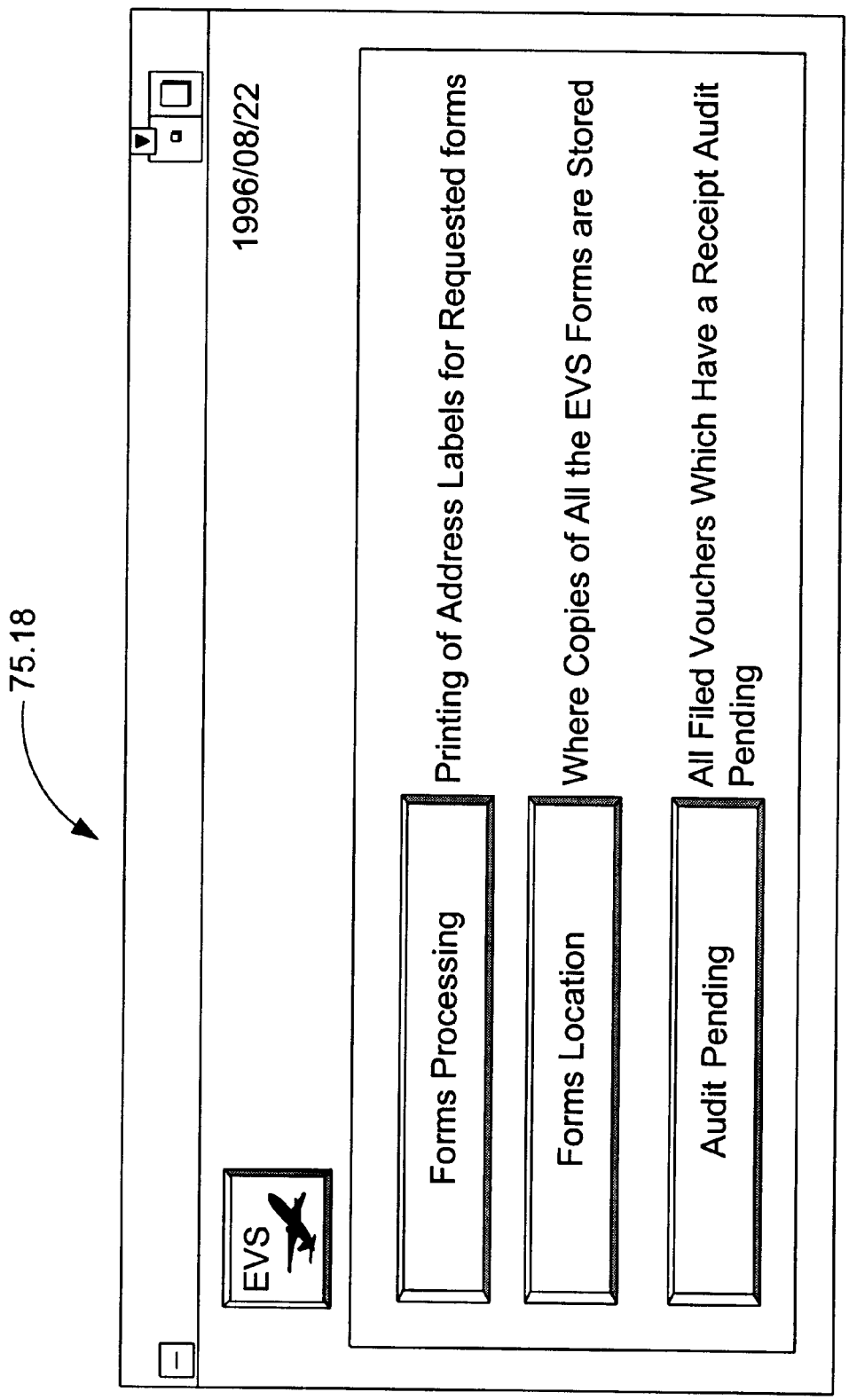
FIG. 21n is a schematic diagram of a report menu produced by a reports module according to the first embodiment of the invention.

Referring to FIG. 21n, the reports module (75.10) presents to the user a window shown generally at 75.18, listing the forms processing, forms location and audit pending options. The forms processing option provides for printing of address labels for requested forms, the forms location option indicates where copies of forms associated with the system are stored and the audit pending option sends a report to a print destination listing all electronic vouchers which have a receipt audit pending.

Alternatives

Referring back to FIG. 1, in an alternative embodiment, the system may include a telephone 250, a telephone interface 252 and a telephone interface routine 254. The telephone interface 252 includes a voice response unit 256 operable to recognize pre-determined commands which may be keyed by a user, on a keypad of the telephone. The telephone interface routine 254 includes PERCEPTION (TM) software stored in the program memory 28. The telephone 250 may be remote from the central server 12 and may obtain access to the telephone interface 252 through a conventional public telephone network 258. The voice response unit, running under the control of the PERCEPTION software is operable to provide an audio menu with audible prompts, over the public telephone network, to the user at the telephone 250 and is operable to present to the central server user response data representing keystrokes entered by the user on a keypad 260 of the telephone. The PERCEPTION software formats the user response data into a form compatible with the various modules which interact with the user, as discussed above. Such data is stored in at least the charge field, expense field and voucher identification field respectively, of a corresponding expense voucher record.

FIGS. 22 and 22A

To facilitate efficient use of the telephone for entry of expense information, it is preferred to employ expense worksheets as shown at 262 in FIG. 22. These worksheets inform the user of the order in which certain prompts will be provided, provide an ordered format which allows the user to pre-determine responses before prompts are given and facilitates the user simply reading from the worksheets, numbers which are to be entered at the keypad in response to such prompts.

Generally, it will be appreciated that the system performs a method of processing expense reimbursement claims, where such claims are supported by at least one receipt. The receipt is associated with identifying indicia, which in this case is a barcode on a container in the form of an envelope, in which the receipts are placed. The system carries out the method by defining in memory, an expense voucher record having a charge field for identifying an entity incurring expenses, and expense field for identifying expenses incurred by the entity and a voucher identification field for identifying the voucher. The voucher identification field is loaded with a first code associated with the identifying indicia and in this embodiment, the first code is a conventional numeric representation of the voucher number. The method further involves comparing the contents of the charge field and the expense fields with corresponding reference data, according to predefined verification criteria to determine whether or not the contents of the charge field and the expense fields meet the verification criteria. In other words, the chargeable entity must be a valid entity to which charges can be applied and the expense amounts for each expense category must not exceed predefined limits. When the predefined criteria is met by the contents of the charge field and the expense fields, the expense voucher record is associated with a position in a receipt required list. In effect, the voucher number is simply added to a list. At another location in the system or perhaps in the same location in which the expense voucher record is defined, the physical presence of the receipt is detected. This involves passing the envelope in which the receipt is placed in the scanning field of a barcode reader. The barcode reader produces a second code interpreted from the barcode or identifying indicia on the envelope and the receipt required list is searched for a corresponding first code or voucher number. When a corresponding first code or voucher number is located, a payment record is added to a payment list. The payment record including the contents of the voucher identification field, the charge field and the expense field of the expense voucher record. Where the expense voucher contains or includes a plurality of expense fields, the sum total of the contents of those fields in a common currency is included in the payment record. The payment list is then formatted and provided to a payment service provider which issues payment to the employee for the expenses incurred.

While the invention has been disclosed in connection with a widely distributed computer network system, it will be appreciated that the basic functionality of the system may be implemented on an office network or even on a single stand alone personal computer. Thus, the basic functionality of the indicated method may be coded in computer recognizable codes and stored on a computer readable storage medium operable to be read by a computer on which the method is to be carried.

While specific embodiments of the invention have been described and illustrated, such embodiments should be considered illustrative of the invention only and not as limiting the invention as construed in accordance with the accompanying claims.

What is claimed is:

1. A method of processing expense reimbursement claims supported by at least one receipt associated with identifying indicia, the method comprising the steps of:
   a) defining in memory, an expense voucher record having a charge field for identifying an entity incurring expenses, an expense field for identifying expenses incurred by said entity, and a voucher identification field;
   b) loading said voucher identification field with a first code associated with said identifying indicia;
   c) comparing the contents of said charge field and said expense fields with corresponding reference data, according to pre-defined verification criteria to determine whether or not the contents of said charge field and said expense field meet said verification criteria;
   d) upon meeting said pre-defined verification criteria, associating said expense voucher record with a position in a receipt required list;
   e) detecting the physical presence of said at least one receipt and producing a second code associated with said identifying indicia in response to detecting the physical presence of said at least one receipt;
   f) searching said receipt required list to locate a corresponding voucher record having a first code matching said second code; and
   g) when a corresponding voucher record is located, adding a payment record to a payment list, said payment record including the contents of said voucher identification field, said charge field and said expense field of said expense voucher record.

2. A method as claimed in claim 1 wherein the step of defining includes the step of maintaining a plurality of expense fields for storing expense amounts associated with different categories of expenses and calculating a sum total of expense amounts stored in said expense fields.

3. A method as claimed in claim 2 wherein the step of calculating includes the steps of:
   a) identifying a currency in which said expense amounts were incurred;
   b) receiving currency exchange rates for currencies identified; and
   c) using said currency exchange rates to convert said expense amounts into common currency values prior to calculating said sum total.

4. A method as claimed in claim 1 further including the step of placing said at least one receipt in a container having said identifying indicia.

5. A method as claimed in claim 4 wherein the step of detecting includes the step of reading said indicia.

6. A method as claimed in claim 5 wherein the step of reading includes the step of reading a barcode.

7. A method as claimed in claim 6 wherein the step of reading includes reading a barcoded voucher number.

8. A method as claimed in claim 7 further including the step of producing a storage record having a field for storing the voucher number identified by said indicia, a scan date field for storing the date on which said indicia is read, and a storage code field for storing a storage code identifying a storage location associated with said at least one receipt.

9. A method as claimed in claim 1 further including the step of removing said association of said corresponding voucher record with said receipt required list.

10. A method as claimed in claim 1 further including the step of transmitting to a payment service provider, said payment list.

11. A method as claimed in claim 1 further including the step of identifying said expense voucher record as requiring review.

12. A method as claimed in claim 11 wherein the step of identifying includes the step of associating a review field and a review date field with said expense voucher record.

13. A method as claimed in claim 12 further including the step of reading said review field upon finding a corresponding expense voucher record.

14. A method as claimed in claim 13 further including the step of determining whether said review field has contents equal to a pre-defined value and if so, associating said expense voucher record with a manager processing queue prior to associating said expense voucher record with said receipt required list.

15. A method as claimed in claim 14 further including the step of storing in said review date field a value indicative of a date on which said expense voucher record was reviewed.

16. A method as claimed in claim 1 wherein the step of defining includes the step of presenting to said user a menu of expense categories and a data entry format.

17. A method as claimed in claim 16 wherein the step of presenting includes presenting an audio menu at a remote telephone and storing in said charge field, expense field and voucher identification field respectively, data entered by a user at a keypad of said remote telephone.

18. A method as claimed in claim 16 wherein the step of presenting includes presenting a visual menu at a video display terminal.

19. A method as claimed in claim 18 wherein the step of defining in memory is performed at a first user terminal.

20. A method as claimed in claim 19 further including the step of transmitting said expense voucher record to a central server, and maintaining said receipt required located generally at said central server.

21. A computer-readable storage medium on which is stored a plurality of computer-readable codes operable to direct said computer to process expense reimbursement claims supported by at least one receipt associated with identifying indicia, by:
   a) defining in memory, an expense voucher record having a charge field for identifying an entity incurring expenses, an expense field for identifying expenses incurred by said entity, and a voucher identification field;
   b) loading said voucher identification field with a first code associated with said identifying indicia;
   c) comparing the contents of said charge field and said expense fields with corresponding reference data, according to pre-defined verification criteria to determine whether or not the contents of said charge field and said expense field meet said verification criteria;
   d) upon meeting said pre-defined verification criteria, associating said expense voucher record with a position in a receipt required list;
   e) detecting the physical presence of said at least one receipt and producing a second code associated with said identifying indicia in response to detecting the physical presence of said at least one receipt;
   f) searching said receipt required list to locate a corresponding voucher record having a first code matching said second code; and
   g) when a corresponding voucher record is located, adding a payment record to a payment list, said payment record including the contents of said voucher identification field, said charge field and said expense field of said expense voucher record.

22. A computer-readable storage medium as claimed in claim 21 further including codes operable to direct the computer to perform the step of maintaining a plurality of expense fields for storing expense amounts associated with different categories of expenses and calculating a sum total of expense amounts stored in said expense fields.

23. A computer-readable storage medium as claimed in claim 21 further including codes operable to direct the computer to perform the steps of:
a) identifying a currency in which said expense amounts were incurred;
b) receiving currency exchange rates for currencies identified; and
c) using said currency exchange rates to convert said expense amounts into common currency values prior to calculating said sum total.

24. A computer-readable storage medium as claimed in claim 21 further including codes operable to direct the computer to perform the step of reading said indicia from a container in which said at least one receipt are placed.

25. A computer-readable storage medium as claimed in claim 24 further including codes operable to direct the computer to perform the step of reading a barcode.

26. A computer-readable storage medium as claimed in claim 24 further including codes operable to direct the computer to perform the step of reading a barcoded expense voucher number.

27. A computer-readable storage medium as claimed in claim 24 further including codes operable to direct the computer to perform the step of producing a storage record having a field for storing the voucher number identified by said indicia, a scan date field for storing the date on which said indicia is read, and a storage code field for storing a storage code identifying a storage location associated with said at least one receipt.

28. A computer-readable storage medium as claimed in claim 21 further including codes operable to direct the computer to perform the step of removing said association of said corresponding voucher record with said receipt required list.

29. A computer-readable storage medium as claimed in claim 21 further including codes operable to direct the computer to perform the step of transmitting to a payment service provider, said payment list.

30. A computer-readable storage medium as claimed in claim 21 further including codes operable to direct the computer to perform the step of identifying said expense voucher record as requiring review.

31. A computer-readable storage medium as claimed in claim 30 further including codes operable to direct the computer to perform the step of associating a review field and a review date field with said expense voucher record.

32. A computer-readable storage medium as claimed in claim 31 further including codes operable to direct the computer to perform the step of reading said review field upon finding a corresponding expense voucher record.

33. A computer-readable storage medium as claimed in claim 32 further including codes operable to direct the computer to perform the step of determining whether said review field has contents equal to a pre-defined value and if so, associating said expense voucher record with a manager processing queue prior to associating said expense voucher record with said receipt required list.

34. A computer-readable storage medium as claimed in claim 33 further including codes operable to direct the computer to perform the step of storing in said review date field a value indicative of a date on which said expense voucher record was reviewed.

35. A computer-readable storage medium as claimed in claim 21 further including codes operable to direct the computer to perform the step of presenting to said user a menu of expense categories and a data entry format.

36. A computer-readable storage medium as claimed in claim 35 further including codes operable to direct a computer at a first user terminal to perform the step of defining in memory.

37. A computer-readable storage medium as claimed in claim 36 further including codes operable to direct the computer to perform the step of transmitting said expense voucher record to a central server.

38. A system for processing expense reimbursement claims supported by at least one receipt associated with identifying indicia, the system including:
a) computer readable memory, in which is defined an expense voucher record having a charge field for identifying an entity incurring expenses, an expense field for identifying expenses incurred by the entity, and a voucher identification field;
b) a computer in communication with said memory for:
i) loading the voucher identification field with a first code associated with the identifying indicia;
ii) comparing the contents of the charge field and the expense fields with corresponding reference data, according to pre-defined verification criteria to determine whether or not the contents of the charge field and the expense field meet the verification criteria;
iii) upon meeting the pre-defined verification criteria, associating the expense voucher record with a position in a receipt required list;
iv) detecting the physical presence of the at least one receipt and producing a second code associated with the identifying indicia in response to detecting the physical presence of the at least on receipt;
v) searching the receipt required list to locate a corresponding voucher record having a first code matching the second code; and
vi) when a corresponding voucher record is located, adding a payment record to a payment list, the payment record including the contents of the voucher identification field, the charge field and the expense field of the expense voucher record.

39. A system as claimed in claim 38 wherein said computer is operable to maintain a plurality of expense fields for storing expense amounts associated with different categories of expenses and calculate a sum total of expense amounts stored in the expense fields.

40. A system as claimed in claim 39 wherein said computer is programmed to:
a) identify a currency in which the expense amounts were incurred;
b) receive currency exchange rates for currencies identified; and
c) use said currency exchange rates to convert the expense amounts into common currency values prior to calculating said sum total.

41. A system as claimed in claim 38 further including a reader for reading said indicia.

42. A system as claimed in claim 41 further including a reader for reading a barcoded expense voucher number.

43. A system as claimed in claim 38 wherein said computer is programmed to define in said memory a storage record having a field for storing the voucher number identified by the indicia, a scan date field for storing the date on which the indicia is read, and a storage code field for storing a storage code identifying a storage location associated with the at least one receipt.

44. A system as claimed in claim 38 wherein said computer is programmed to remove the association of the corresponding voucher record with the receipt required list.

45. A system as claimed in claim 38 wherein said computer is programmed to transmit to a payment service provider, the payment list.

46. A system as claimed in claim 38 wherein said computer is programmed to identify the expense voucher record as requiring review.

47. A system as claimed in claim 46 wherein said computer is programmed to associate a review field and a review date field with the expense voucher record.

48. A system as claimed in claim 47 wherein said computer is programmed to read the review field upon finding a corresponding expense voucher record.

49. A system as claimed in claim 48 wherein said computer is programmed to determine whether said review field has contents equal to a pre-defined value and if so, associate the expense voucher record with a manager processing queue, prior to associating said expense voucher record with said receipt required list.

50. A system as claimed in claim 49 wherein said computer is programmed to store in said review date field a value indicative of a date on which the expense voucher record was reviewed.

51. A system as claimed in claim 38 wherein said computer is programmed to present to the user a menu of expense categories and a data entry format.

52. A system as claimed in claim 51 further including a voice response unit controlled by said computer and wherein said computer is programmed to present an audio menu to a remote telephone and store in the charge field, expense field and voucher identification field respectively, data entered by a user at a keypad of the remote telephone.

53. A system as claimed in claim 51 further including a video display terminal in communication with said computer and wherein said computer is programmed to present a visual menu at said video display terminal.

54. A system for processing expense reimbursement claims supported by at least one receipt associated with identifying indicia, the system including:

a) a computer network having a central server and a plurality of computer user terminals, each of said user terminals having:
  i) computer readable memory, in which is defined an expense voucher record having a charge field for identifying an entity incurring expenses, an expense field for identifying expenses incurred by the entity, and a voucher identification field;
  ii) a computer in communication with said memory for:
    1) loading the voucher identification field with a first code associated with the identifying indicia;
    2) comparing the contents of the charge field and the expense fields with corresponding reference data, according to pre-defined verification criteria to determine whether or not the contents of the charge field and the expense field meet the verification criteria;
    3) upon meeting the pre-defined verification criteria, send an identification of said expense voucher record to said central server;
  iii) said central server being operable to define and maintain a receipt required list, and being operable to receive said identification of said expense voucher record and associate said expense voucher record with a position in said receipt required list;
  iv) at least one of said terminals being operable to detect the physical presence of said at least one receipt and produce a second code associated with said identifying indicia in response to detecting the physical presence of said at least one receipt;
  v) said central server being further operable maintain a payment list and operable to search the receipt required list to locate a corresponding voucher record having a first code matching the second code and when a corresponding voucher record is located, produce a payment record and add said payment record to said payment list, said payment record including the contents of the voucher identification field, the charge field and the expense field of the expense voucher record.

* * * * *